US010827220B2

(12) United States Patent
Loheide et al.

(10) Patent No.: US 10,827,220 B2
(45) Date of Patent: Nov. 3, 2020

(54) CLIENT-SIDE PLAYBACK OF PERSONALIZED MEDIA CONTENT GENERATED DYNAMICALLY FOR EVENT OPPORTUNITIES IN PROGRAMMING MEDIA CONTENT

(71) Applicant: Turner Broadcasting System, Inc., Atlanta, GA (US)

(72) Inventors: Donald Jude Loheide, Mableton, GA (US); Matthew Paul Giles, Marietta, GA (US); Gregory Mcclain Stigall, Douglasville, GA (US); Nishith Kumar Sinha, Mableton, GA (US); Cindy Loren Campbell, Atlanta, GA (US); James J Arnzen, Atlanta, GA (US); Nicolas Paul Webb, Mcdonough, GA (US)

(73) Assignee: TURNER BROADCASTING SYSTEM, INC., Atlanta, GA (US)

( * ) Notice: Subject to any disclaimer, the term of this patent is extended or adjusted under 35 U.S.C. 154(b) by 0 days.

(21) Appl. No.: 15/986,361

(22) Filed: May 22, 2018

(65) Prior Publication Data

US 2018/0343482 A1 Nov. 29, 2018

Related U.S. Application Data

(60) Provisional application No. 62/511,190, filed on May 25, 2017.

(51) Int. Cl.
*H04N 21/458* (2011.01)
*H04L 29/08* (2006.01)
(Continued)

(52) U.S. Cl.
CPC ....... *H04N 21/458* (2013.01); *G06Q 30/0242* (2013.01); *G06Q 30/0251* (2013.01);
(Continued)

(58) Field of Classification Search
None
See application file for complete search history.

(56) References Cited

U.S. PATENT DOCUMENTS 3,751,581 A 8/1973 Sakata et al.
4,500,930 A 2/1985 Hamalainen et al.
(Continued)

OTHER PUBLICATIONS

Final Office Action for U.S. Appl. No. 15/986,218 dated Apr. 24, 2019.
(Continued)

*Primary Examiner* — James R Marandi
(74) *Attorney, Agent, or Firm* — Chip Law Group

(57) ABSTRACT

A media presentation and distribution system (MPDS) communicatively coupled to a client device, which handles media content distribution via a content delivery network, to a client device associated with a user: identifies candidate time intervals in programming media content played at the client device based on at least a request received from the client device. The MPDS retrieves media content from a media store in the MPDS. The media content is retrieved based on at least one of the user intent information and a plurality of targeting parameters associated with the user. The MPDS dynamically generates personalized media content that corresponds to the candidate time intervals in the programming media content and further instructs playback of the dynamically generated personalized media content at the identified candidate time intervals based on the specified version of the programming media content played at the client device.

20 Claims, 11 Drawing Sheets

(51) Int. Cl.

| | | |
|---|---|---|
| *H04N 21/431* | (2011.01) | |
| *H04N 21/81* | (2011.01) | |
| *G06Q 30/02* | (2012.01) | |
| *H04L 29/06* | (2006.01) | |
| *H04N 21/478* | (2011.01) | |
| *H04N 21/233* | (2011.01) | |
| *H04N 21/234* | (2011.01) | |
| *H04N 21/2387* | (2011.01) | |
| *H04N 21/2389* | (2011.01) | |
| *H04N 21/8545* | (2011.01) | |
| *G06Q 30/06* | (2012.01) | |
| *H04N 21/2543* | (2011.01) | |
| *H04N 21/44* | (2011.01) | |
| *H04N 21/845* | (2011.01) | |
| *H04N 21/235* | (2011.01) | |
| *H04N 21/258* | (2011.01) | |
| *H04N 21/435* | (2011.01) | |
| *H04N 21/6332* | (2011.01) | |
| *H04L 9/32* | (2006.01) | |
| *H04N 21/239* | (2011.01) | |
| *H04N 21/24* | (2011.01) | |
| *H04N 21/266* | (2011.01) | |
| *H04N 21/2668* | (2011.01) | |
| *H04N 21/262* | (2011.01) | |
| *H04N 21/472* | (2011.01) | |
| *H04N 21/6587* | (2011.01) | |
| *H04N 21/835* | (2011.01) | |
| *H04N 21/84* | (2011.01) | |
| *H04N 21/8358* | (2011.01) | |
| *H04H 20/10* | (2008.01) | |

(52) U.S. Cl.
CPC ..... *G06Q 30/0275* (2013.01); *G06Q 30/0633* (2013.01); *H04L 9/32* (2013.01); *H04L 65/4084* (2013.01); *H04L 65/60* (2013.01); *H04L 67/1097* (2013.01); *H04L 67/125* (2013.01); *H04L 67/16* (2013.01); *H04L 67/306* (2013.01); *H04L 67/32* (2013.01); *H04L 67/42* (2013.01); *H04N 21/233* (2013.01); *H04N 21/2353* (2013.01); *H04N 21/2387* (2013.01); *H04N 21/2393* (2013.01); *H04N 21/23418* (2013.01); *H04N 21/23424* (2013.01); *H04N 21/23892* (2013.01); *H04N 21/24* (2013.01); *H04N 21/2543* (2013.01); *H04N 21/25883* (2013.01); *H04N 21/25891* (2013.01); *H04N 21/266* (2013.01); *H04N 21/2668* (2013.01); *H04N 21/26208* (2013.01); *H04N 21/26241* (2013.01); *H04N 21/435* (2013.01); *H04N 21/4312* (2013.01); *H04N 21/4316* (2013.01); *H04N 21/44008* (2013.01); *H04N 21/44016* (2013.01); *H04N 21/47217* (2013.01); *H04N 21/47815* (2013.01); *H04N 21/6332* (2013.01); *H04N 21/6587* (2013.01); *H04N 21/812* (2013.01); *H04N 21/835* (2013.01); *H04N 21/84* (2013.01); *H04N 21/845* (2013.01); *H04N 21/8545* (2013.01); *G06Q 2220/00* (2013.01); *H04H 20/10* (2013.01); *H04N 21/8358* (2013.01)

(56) References Cited

U.S. PATENT DOCUMENTS

| | | |
|---|---|---|
| 5,294,981 A | 3/1994 | Yazolino et al. |
| 6,229,524 B1 | 5/2001 | Chernock et al. |
| 6,378,129 B1 | 4/2002 | Zetts |
| 6,434,621 B1 | 8/2002 | Pezzillo et al. |
| 6,625,811 B1 | 9/2003 | Kaneko |
| 6,701,355 B1 | 3/2004 | Brandt et al. |
| 6,727,914 B1 | 4/2004 | Gutta |
| 7,051,352 B1 | 5/2006 | Schaffer |
| 7,337,458 B2 | 2/2008 | Michelitsch et al. |
| 7,380,262 B2 | 5/2008 | Wang et al. |
| 7,581,237 B1 | 8/2009 | Kurapati |
| 7,840,980 B2 | 11/2010 | Gutta |
| 7,985,134 B2 | 7/2011 | Ellis |
| 8,005,826 B1 | 8/2011 | Sahami et al. |
| 8,099,757 B2 | 1/2012 | Riedl et al. |
| 8,132,203 B2 | 3/2012 | Heer |
| 8,533,761 B1 | 9/2013 | Sahami et al. |
| 8,572,649 B1 | 10/2013 | Gossweiler et al. |
| 8,578,042 B2 | 11/2013 | Hu et al. |
| 8,631,440 B2 | 1/2014 | Gossweiler et al. |
| 8,826,443 B1 | 9/2014 | Raman et al. |
| 8,842,879 B2 | 9/2014 | Laksono et al. |
| 8,843,965 B1 | 9/2014 | Kurapati et al. |
| 9,094,639 B2 | 7/2015 | Yim et al. |
| 9,130,918 B2 | 9/2015 | Picconi et al. |
| 9,342,668 B2 | 5/2016 | Wang et al. |
| 9,380,264 B1 | 6/2016 | Vakalapudi |
| 9,390,447 B2 | 7/2016 | Smith |
| 10,075,753 B2 | 9/2018 | Loheide et al. |
| 2002/0038457 A1 | 3/2002 | Numata et al. |
| 2002/0178447 A1 | 11/2002 | Plotnick et al. |
| 2003/0023757 A1 | 1/2003 | Ishioka et al. |
| 2003/0026628 A1 | 2/2003 | Arimoto |
| 2003/0051239 A1 | 3/2003 | Hudspeth |
| 2003/0126600 A1* | 7/2003 | Heuvelman ........ H04N 5/44543 725/35 |
| 2003/0151538 A1 | 8/2003 | Escobosa et al. |
| 2003/0182658 A1 | 9/2003 | Alexander |
| 2003/0212708 A1 | 11/2003 | Potrebic et al. |
| 2004/0022278 A1 | 2/2004 | Thomas et al. |
| 2004/0031056 A1 | 2/2004 | Wolff |
| 2004/0128682 A1 | 7/2004 | Liga et al. |
| 2004/0163103 A1 | 8/2004 | Swix et al. |
| 2005/0015816 A1 | 1/2005 | Christofalo et al. |
| 2005/0060745 A1 | 3/2005 | Riedl et al. |
| 2005/0096978 A1 | 5/2005 | Black |
| 2005/0120369 A1 | 6/2005 | Matz |
| 2005/0132401 A1 | 6/2005 | Boccon-Gibod et al. |
| 2005/0135613 A1 | 6/2005 | Brandenburg et al. |
| 2006/0031889 A1 | 2/2006 | Bennett et al. |
| 2006/0064730 A1 | 3/2006 | Rael et al. |
| 2006/0122916 A1 | 6/2006 | Kassan |
| 2006/0287915 A1 | 12/2006 | Boulet et al. |
| 2007/0011718 A1 | 1/2007 | Nee |
| 2007/0033419 A1 | 2/2007 | Kocher et al. |
| 2007/0238035 A1 | 10/2007 | Holscher et al. |
| 2007/0250901 A1 | 10/2007 | McIntire et al. |
| 2008/0086742 A1 | 4/2008 | Aldrey et al. |
| 2008/0201735 A1 | 8/2008 | Sumiyoshi et al. |
| 2008/0271078 A1 | 10/2008 | Gossweiler et al. |
| 2008/0271080 A1 | 10/2008 | Gossweiler et al. |
| 2008/0320513 A1 | 12/2008 | Wong et al. |
| 2009/0070808 A1 | 3/2009 | Jacobs |
| 2009/0070819 A1 | 3/2009 | Gajda et al. |
| 2009/0100452 A1 | 4/2009 | Hudgeons et al. |
| 2009/0254934 A1 | 10/2009 | Grammens |
| 2009/0256972 A1 | 10/2009 | Ramaswamy et al. |
| 2009/0285217 A1 | 11/2009 | Frink et al. |
| 2009/0287790 A1 | 11/2009 | Upton et al. |
| 2010/0125880 A1 | 5/2010 | Roewe |
| 2010/0146548 A1 | 6/2010 | Yim et al. |
| 2010/0146559 A1 | 6/2010 | Lee et al. |
| 2010/0169914 A1 | 7/2010 | Williamson et al. |
| 2010/0325655 A1 | 12/2010 | Perez |
| 2010/0325657 A1 | 12/2010 | Sellers et al. |
| 2011/0022471 A1 | 1/2011 | Brueck et al. |
| 2011/0052144 A1 | 3/2011 | Abbas et al. |
| 2011/0123062 A1 | 5/2011 | Hilu |
| 2011/0161500 A1 | 6/2011 | Yengalasetti et al. |
| 2011/0164115 A1* | 7/2011 | Bennett ............ G06F 3/14 348/46 |
| 2011/0177775 A1 | 7/2011 | Gupta et al. |

(56) References Cited

U.S. PATENT DOCUMENTS

| | | |
|---|---|---|
| 2011/0209181 A1 | 8/2011 | Gupta et al. |
| 2011/0238754 A1 | 9/2011 | Dasilva et al. |
| 2012/0017282 A1 | 1/2012 | Kang et al. |
| 2012/0110621 A1 | 5/2012 | Gossweiler |
| 2012/0143693 A1 | 6/2012 | Chung et al. |
| 2012/0192232 A1 | 7/2012 | Ellis |
| 2012/0271942 A1 | 10/2012 | Walker et al. |
| 2012/0272264 A1 | 10/2012 | Suzuki et al. |
| 2012/0284737 A1 | 11/2012 | Savoor et al. |
| 2012/0304223 A1 | 11/2012 | Sargent et al. |
| 2013/0121487 A1 | 5/2013 | Lorberbaum et al. |
| 2013/0160051 A1 | 6/2013 | Armstrong et al. |
| 2013/0198328 A1 | 8/2013 | Green et al. |
| 2013/0205212 A1 | 8/2013 | Sinha et al. |
| 2013/0208811 A1 | 8/2013 | Liu et al. |
| 2013/0227283 A1 | 8/2013 | Williamson et al. |
| 2013/0227284 A1 | 8/2013 | Pfeffer et al. |
| 2013/0263168 A1 | 10/2013 | Choi |
| 2013/0263182 A1 | 10/2013 | Ivy et al. |
| 2013/0276023 A1 | 10/2013 | Kent et al. |
| 2013/0305287 A1 | 11/2013 | Wong et al. |
| 2013/0312041 A1 | 11/2013 | Gresta |
| 2013/0325605 A1 | 12/2013 | Callaghan et al. |
| 2014/0013354 A1 | 1/2014 | Johnson et al. |
| 2014/0020017 A1 | 1/2014 | Stern et al. |
| 2014/0032259 A1 | 1/2014 | LaFever et al. |
| 2014/0033240 A1 | 1/2014 | Card |
| 2014/0071818 A1 | 3/2014 | Wang et al. |
| 2014/0143806 A1 | 5/2014 | Steinberg et al. |
| 2014/0150019 A1 | 5/2014 | Ma et al. |
| 2014/0152894 A1 | 6/2014 | Childs et al. |
| 2014/0157312 A1 | 6/2014 | Williams et al. |
| 2014/0173666 A1 | 6/2014 | Gordon et al. |
| 2014/0189743 A1 | 7/2014 | Kennedy et al. |
| 2014/0189754 A1 | 7/2014 | Major et al. |
| 2014/0237243 A1 | 8/2014 | Ma et al. |
| 2014/0282723 A1 | 9/2014 | Sinha et al. |
| 2014/0310745 A1 | 10/2014 | Canney et al. |
| 2014/0317666 A1 | 10/2014 | Chiarulli et al. |
| 2014/0351843 A1 | 11/2014 | Theriault |
| 2014/0359656 A1 | 12/2014 | Banica et al. |
| 2014/0366068 A1 | 12/2014 | Burkitt et al. |
| 2015/0012926 A1 | 1/2015 | Wei et al. |
| 2015/0033255 A1 | 1/2015 | Neumann et al. |
| 2015/0058874 A1 | 2/2015 | Sun et al. |
| 2015/0074732 A1 | 3/2015 | Green et al. |
| 2015/0106856 A1 | 4/2015 | Rankine |
| 2015/0127845 A1 | 5/2015 | Phillips et al. |
| 2015/0237386 A1 | 8/2015 | Sheehan et al. |
| 2015/0237389 A1 | 8/2015 | Grouf et al. |
| 2015/0249865 A1 | 9/2015 | Oliveira |
| 2015/0271234 A1 | 9/2015 | O'Malley et al. |
| 2015/0289022 A1 | 10/2015 | Gross |
| 2015/0382042 A1 | 12/2015 | Wagenaar et al. |
| 2015/0382047 A1 | 12/2015 | Os et al. |
| 2015/0382274 A1 | 12/2015 | Logvinov et al. |
| 2016/0029055 A1* | 1/2016 | Villegas Nunez ...... H04L 65/60 725/14 |
| 2016/0063530 A1 | 3/2016 | Lin |
| 2016/0073155 A1 | 3/2016 | Subramaniam et al. |
| 2016/0112740 A1 | 4/2016 | Francisco et al. |
| 2016/0127786 A1 | 5/2016 | Langer |
| 2016/0127788 A1 | 5/2016 | Roberts et al. |
| 2016/0182954 A1* | 6/2016 | Nguyen ............. H04N 21/4668 725/10 |
| 2016/0198202 A1 | 7/2016 | Brandenburg et al. |
| 2016/0227260 A1 | 8/2016 | Hundemer et al. |
| 2016/0255391 A1 | 9/2016 | Noble |
| 2016/0308958 A1 | 10/2016 | Navali et al. |
| 2016/0316247 A1 | 10/2016 | Biagini et al. |
| 2017/0064400 A1 | 3/2017 | Riegel et al. |
| 2017/0070789 A1 | 3/2017 | Liassides et al. |
| 2017/0085935 A1 | 3/2017 | Riedel et al. |
| 2017/0099525 A1 | 4/2017 | Ray et al. |
| 2017/0171610 A1 | 6/2017 | Nair et al. |
| 2017/0193544 A1* | 7/2017 | Glasgow ............ G06Q 30/0242 |
| 2017/0195718 A1 | 7/2017 | Nair et al. |
| 2017/0201779 A1 | 7/2017 | Publicover et al. |
| 2017/0238035 A1 | 8/2017 | Perez |
| 2017/0289597 A1 | 10/2017 | Riedel et al. |
| 2018/0007060 A1 | 1/2018 | Leblang et al. |
| 2018/0048599 A1 | 2/2018 | Arghandiwal et al. |
| 2018/0131986 A1 | 5/2018 | Cole et al. |
| 2018/0165650 A1 | 6/2018 | Kashyape et al. |
| 2018/0184047 A1 | 6/2018 | Simonsen et al. |
| 2018/0300751 A1* | 10/2018 | Hammitt ............. G06K 9/6267 |
| 2020/0244778 A1 | 7/2020 | Berookhim et al. |

OTHER PUBLICATIONS

Final Office Action for U.S. Appl. No. 15/988,308 dated May 9, 2019.
Final Office Action in U.S. Appl. No. 15/396,475 dated Feb. 25, 2019.
Non-Final Office Action in U.S. Appl. No. 15/396,614 dated Mar. 7, 2019.
Non-Final Office Action in U.S. Appl. No. 15/396,468 dated Mar. 1, 2019.
Advisory Action in U.S. Appl. No. 15/396,453 dated Apr. 20, 2018.
Advisory Action in U.S. Appl. No. 15/396,468 dated Jan. 7, 2019.
Advisory Action in U.S. Appl. No. 15/396,475 dated Sep. 20, 2018.
Advisory Action in U.S. Appl. No. 15/396,614 dated Mar. 16, 2018.
Corrected Notice of Allowance in U.S. Appl. No. 15/396,462 dated Aug. 8, 2018.
Corrected Notice of Allowance in U.S. Appl. No. 15/396,462 dated Jul. 11, 2018.
Final Office Action in U.S. Appl. No. 15/396,468 dated Nov. 15, 2018.
Final Office Action in U.S. Appl. No. 15/396,475 dated Jul. 12, 2018.
Final Office Action in U.S. Appl. No. 15/396,614 dated Oct. 25, 2018.
Final Office Action in U.S. Appl. No. 15/396,624 dated Jan. 24, 2019.
Non-Final Office Action in U.S. Appl. No. 15/396,453 dated Jun. 14, 2018.
Non-Final Office Action in U.S. Appl. No. 15/396,468 dated Jul. 3, 2018.
Non-Final Office Action in U.S. Appl. No. 15/396,475 dated Nov. 30, 2018.
Non-Final Office Action in U.S. Appl. No. 15/396,614 dated May 18, 2018.
Non-Final Office Action in U.S. Appl. No. 15/396,624 dated Jul. 13, 2018.
Non-Final Office Action in U.S. Appl. No. 15/986,218 dated Nov. 28, 2018.
Notice of Allowance in U.S. Appl. No. 15/396,453 dated Jan. 10, 2019.
Notice of Allowance in U.S. Appl. No. 15/396,462 dated Jun. 1, 2018.
Notice of Allowance in U.S. Appl. No. 15/396,462 dated May 15, 2018.
Office Action in U.S. Appl. No. 15/396,468 dated Jan. 26, 2018.
Office Action in U.S. Appl. No. 15/396,453 dated Feb. 27, 2018.
Office Action in U.S. Appl. No. 15/396,475 dated Mar. 29, 2018.
Advisory Action for U.S. Appl. No. 15/396,475 dated Jun. 3, 2019.
Advisory Action for U.S. Appl. No. 15/988,308 dated Jul. 16, 2019.
Advisory Action for U.S. Appl. No. 15/986,218 dated Jul. 12, 2019.
Corrected Notice of Allowance for U.S. Appl. No. 15/396,453 dated Jun. 3, 2019.
Corrected Notice of Allowance for U.S. Appl. No. 15/396,453 dated Aug. 21, 2019.
Corrected Notice of Allowance in U.S. Appl. No. 15/396,453 dated Jun. 13, 2019.
Final Office Action for U.S. Appl. No. 15/396,614 dated Aug. 12, 2019.
Non-Final Office Action for U.S. Appl. No. 15/986,451 dated Jun. 27, 2019.

(56) References Cited

OTHER PUBLICATIONS

Non-final Office Action for U.S. Appl. No. 15/988,241 dated Jun. 27, 2019.
Non-Final Office Action for U.S. Appl. No. 15/396,475 dated Aug. 8, 2019.
Non-Final Office Action for U.S. Appl. No. 16/128,104 dated Aug. 21, 2019.
Notice of Allowance for U.S. Appl. No. 15/396,624 dated May 31, 2019.
Supplemental Notice of Allowance for U.S. Appl. No. 15/396,624 dated Aug. 14, 2019.
Corrected Notice of Allowance for U.S. Appl. No. 15/396,624 dated Sep. 5, 2019.
Non-Final Office Action for U.S. Appl. No. 151986,218 dated Sep. 27, 2019.
Advisory Action for U.S. Appl. No. 15/396,614 dated Oct. 24, 2019.
Final Office Action for U.S. Appl. No. 15/396,468 dated Nov. 6, 2019.
Final Office Action for U.S. Appl. No. 15/986,451 dated Dec. 16, 2019.
Final Office Action for U.S. Appl. No. 15/988,241 dated Jan. 8, 2020.
Non-Final Office Action for U.S. Appl. No. 15/396,624 dated Oct. 16, 2019.
Non-Final Office Action for U.S. Appl. No. 15/986,406 dated Dec. 18, 2019.
Non-Final Office Action for U.S. Appl. No. 15/986,286 dated Nov. 29, 2019.
Non-Final Office Action for U.S. Appl. No. 15/988,308 dated Dec. 3, 2019.
Non-Final Office Action for U.S. Appl. No. 15/988,472 dated Dec. 27, 2019.
Non-Final Office Action for U.S. Appl. No. 16/229,310 dated Nov. 29, 2019.
Non-Final Office Action for U.S. Appl. No. 16/229,497 dated Dec. 12, 2019.
Non-Final Office Action for U.S. Appl. No. 16/230,268 dated Jan. 8, 2020.
Non-Final Office Action for U.S. Appl. No. 16/234,870 dated Jan. 9, 2020.
Non-Final Office Action for U.S. Appl. No. 16/236,673 dated Jan. 10, 2020.
Notice of Allowance for U.S. Appl. No. 16/128,104 dated Dec. 12, 2019.
Advisory Action for U.S. Appl. No. 15/396,468 dated Jan. 16, 2020.
Advisory Action for U.S. Appl. No. 15/986,451 dated Feb. 20, 2020.
Corrected Notice of Allowance for U.S. Appl. No. 16/128,104 dated Apr. 15, 2020.
Final Office Action for U.S. Appl. No. 15/396,475 dated Feb. 4, 2020.
Final Office Action for U.S. Appl. No. 15/986,218 dated Jan. 31, 2020.
Final Office Action for U.S. Appl. No. 16/230,268 dated Apr. 17, 2020.
Non-Final Office Action for U.S. Appl. No. 15/396,468 dated Feb. 4, 2020.
Non-Final Office Action for U.S. Appl. No. 15/986,451 dated Apr. 16, 2020.
Non-Final Office Action for U.S. Appl. No. 15/988,492 dated Feb. 18, 2020.
Non-Final Office Action for U.S. Appl. No. 16/229,614 dated Mar. 19, 2020.
Non-Final Office Action for U.S. Appl. No. 16/235,445 dated Apr. 2, 2020.
Notice of Allowance for U.S. Appl. No. 15/988,241 dated Mar. 18, 2020.
Notice of Allowance for U.S. Appl. No. 16/231,467 dated Apr. 16, 2020.
Restriction Requirement for U.S. Appl. No. 16/231,467 dated Feb. 5, 2020.
Advisory Action for U.S. Appl. No. 15/396,475 dated May 13, 2020.
Corrected Notice of Allowance for U.S. Appl. No. 15/988,241 dated Jun. 22, 2020.
Corrected Notice of Allowance for U.S. Appl. No. 15/988,241 dated May 8, 2020.
Corrected Notice of Allowance for U.S. Appl. No. 16/128,104 dated May 20, 2020.
Final Office Action for U.S. Appl. No. 15/988,308 dated May 6, 2020.
Final Office Action for U.S. Appl. No. 15/986,286 dated Jun. 9, 2020.
Final Office Action for U.S. Appl. No. 15/986,406 dated May 26, 2020.
Final Office Action for U.S. Appl. No. 15/988,492 dated May 28, 2020.
Final Office Action for U.S. Appl. No. 16/229,310 dated Jun. 11, 2020.
Final Office Action for U.S. Appl. No. 16/229,497 dated Jun. 11, 2020.
Non-Final Office Action for U.S. Appl. No. 16/236713 dated May 29, 2020.
Notice of Allowance in U.S. Appl. No. 16/236,673 dated May 1, 2020.
Final Office Action for U.S. Appl. No. 15/988,572 dated Jul. 2, 2020.
Corrected Notice of Allowance for U.S. Appl. No. 16/128,104 dated Jul. 8, 2020.
Final Office Action for U.S. Appl. No. 16/229,614 dated Jul. 9, 2020.
Final Office Action for U.S. Appl. No. 16/234,870 dated Jul. 9, 2020.
Non-Final Office Action for U.S. Appl. No. 15/396,475 dated Aug. 6, 2020.
Notice of Allowance for U.S. Appl. No. 15/986,218 dated Jul. 13, 2020.
Corrected Notice of Allowance for U.S. Appl. No. 15/988,241 dated Aug. 13, 2020.
Final Office Action for U.S. Appl. No. 15/235,445 dated Sep. 3, 2020.
Non-Final Office Action for U.S. Appl. No. 15/988,308 dated Sep. 8, 2020.
Non-Final Office Action for U.S. Appl. No. 15/988,482 dated Sep. 10, 2020.
Notice of Allowance for U.S. Appl. No. 15/988,241 dated Aug. 26, 2020.
Notice of Allowance for U.S. Appl. No. 16/230,268 dated Aug. 24, 2020.
Notice of Allowance for U.S. Appl. No. 16/234,870 dated Aug. 19, 2020,

* cited by examiner

US 10,827,220 B2

CLIENT-SIDE PLAYBACK OF PERSONALIZED MEDIA CONTENT GENERATED DYNAMICALLY FOR EVENT OPPORTUNITIES IN PROGRAMMING MEDIA CONTENT

CROSS-REFERENCE TO RELATED APPLICATIONS/INCORPORATION BY REFERENCE

This Application makes reference to, and claims priority to, and claims benefit from U.S. Application Ser. No. 62/511,190, which was filed on May 25, 2017.

This Application also makes reference to:
U.S. application Ser. No. 15/986,218, filed May 22, 2018;
U.S. application Ser. No. 15/988,241, filed May 24, 2018; and
U.S. application Ser. No. 15/986,406, filed May 22, 2018.

Each of the above stated patent applications is hereby incorporated herein by reference in its entirety.

FIELD OF TECHNOLOGY

Certain embodiments of the present disclosure relate to automated media presentation system(s). More specifically, certain embodiments of the present disclosure relate to client-side playback of personalized media content generated dynamically for various event opportunities in programming media content.

BACKGROUND

Recent advancements in the television and broadcasting industry has led to development of various communication technologies and broadcasting platforms. Such communication technologies and broadcasting platforms are revolutionizing the way channel content is generated and presented to users. Currently, there is massive competition amongst the broadcasting platforms that are striving to increase their visual appeal in order to gain wider audience. The television viewing market is no longer exclusively concerned with whether channel content is viewed on a dedicated television or another device capable of consuming the channel content. Due to penetration of new technologies in the television and broadcasting sector, it is evident that the success of television broadcasting will be dependent on the ability of the network provider to gain access to the channel content demanded by the users, and to differentiate their offering from that of incumbent broadcasters or find new modes of content delivery.

Increased competition has led the broadcast providers (or the network providers) to differentiate their offering and provide services that may concurrently handle multiple channels. However, this has resulted in unparalleled levels of system complexity at the servers of the broadcast providers, which requires installation of large hardware infrastructure and resources to handle and maintain uninterrupted content delivery for existing channel and also meet the ever increasing demand for content. Therefore, an advanced system may be required that facilitates handing of certain operations at client-side device to provide enhanced viewer experience, thereby increasing their appeal in order to gain wider audience.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for client-side playback of personalized media content generated dynamically for various event opportunities in programming media content, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1:
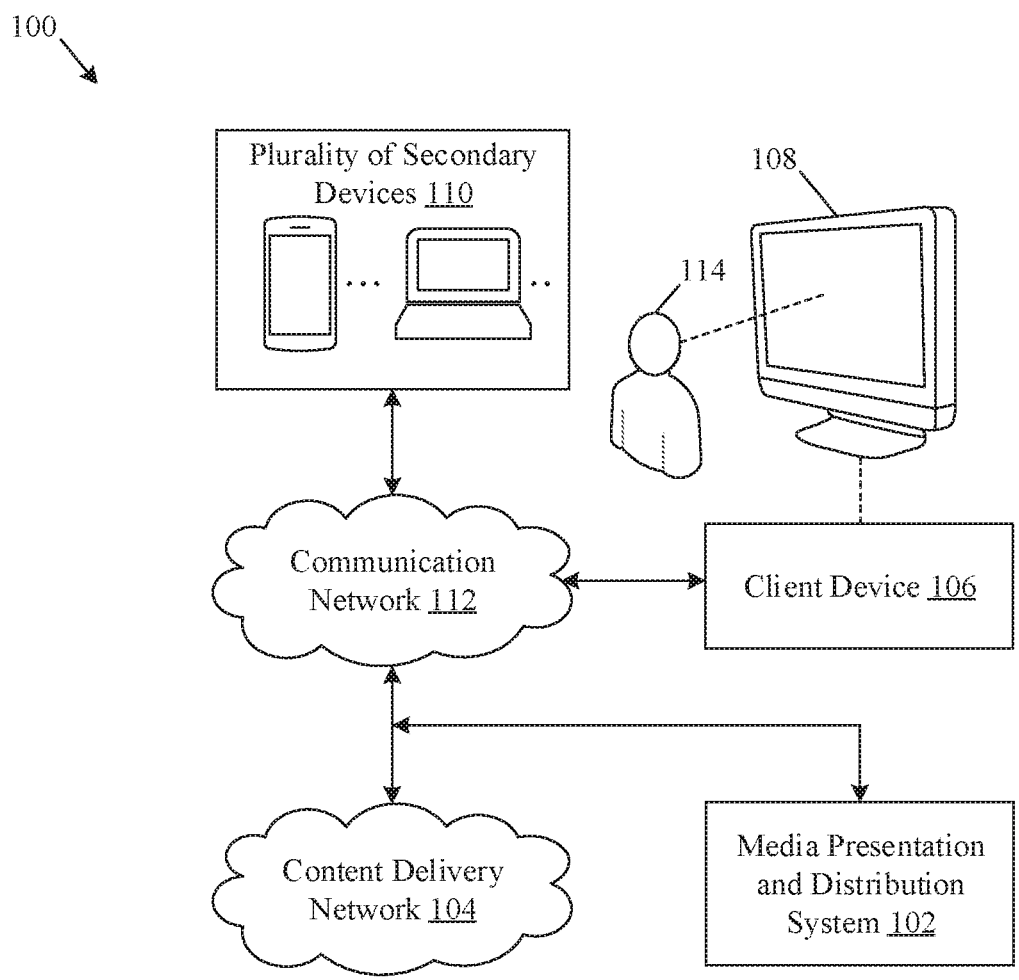
FIG. 1 is a block diagram that illustrates an exemplary network environment for client-side playback of personalized media content generated dynamically for various event opportunities in programming media content, in accordance with various exemplary embodiments of the disclosure.

Certain embodiments of the disclosure may be found in a system and method that handles media content distribution via a content delivery network, to a client device associated with a user. Various embodiments of the disclosure include a media presentation and distribution system that may include one or more processors. The one or more processors may be configured to identify candidate time intervals in programming media content played at the client device based on at least a request received from the client device. The request may include at least one of user intent information and a plurality of constraints associated with a user. The one or more processors may be further configured to retrieve media content from a media store in the media presentation and distribution system. The media content may be retrieved based on at least one of the user intent information and a plurality of targeting parameters associated with the user. The retrieved media content may correspond to at least one of a static type of media content or a dynamic type of media content.

The one or more processors may be further configured to dynamically generate personalized media content that corresponds to the candidate time intervals in the programming media content. The personalized media content may be dynamically generated based on a modification of the retrieved media content in accordance with a specified version of the programming media content played at the client device and at least one of the plurality of constraints associated with the user. The modification of the retrieved media content is done based on at least the plurality of constraints. The modification may correspond to a trimmed version of the retrieved media content or a compressed version, based on removal of one or more frames, in the retrieved media content. The dynamically generated personalized media content may include at least one segment of the retrieved media content and at least one of media transitions, pre-encoded video-on-demand (VOD) assets, live content, a media clip, or media highlights.

The one or more processors may be further configured to instruct playback of the dynamically generated personalized media content at the identified candidate time intervals based on the specified version of the programming media content played at the client device. The dynamically generated personalized media content may be presented at the identified candidate time intervals such that an airtime efficacy of the candidate time intervals is maximized. The maximized airtime efficacy may increase a likelihood of user engagement and a user attention span with the generated personalized media content at the client device.

In accordance with an embodiment, the identified candidate time intervals may further correspond to a first time interval prior to a start of the programming media content, a second time interval during playback of the programming media content, or a third time interval at an end of the programming media content. The one or more processors may be further configured to determine the first time interval, the second time interval, and the third time interval based at least on a contextual analysis of the programming media content at the client device or tags associated with a plurality of segments of the programming media content. The first time interval, the second time interval, and the third time interval in the programming media content may correspond to at least one of a start credit, an end credit, an ad break, tagged media content, or a lull point in the programming media content, and the like.

In accordance with an embodiment, the plurality of constraints may correspond to at least a content constraint, a media format constraint, a time constraint, an inventory constraint, or a device constraint. The request may further include a user identifier (ID), a client ID of the client device, and the plurality of targeting parameters associated with the user. The user intent information may include at least one of event information, situation information, or circumstance information associated with user engagement with the programming media content at the client device. The plurality of targeting parameters associated with the user may include at least one of one or more user preferences, a user profile, demographic details, historical preferences, a time of day, a time of next event, and a plurality of external inputs from the client device.

In accordance with an embodiment, the one or more processors may be further configured to receive the plurality of external inputs from an application manager executed at the client device. The plurality of external inputs may include at least one of a calendar schedule of the user, local weather conditions, a boarding pass of the user, a geographical location of the user, and a local traffic report.

In accordance with an embodiment, the one or more processors may be further configured to generate a play-out schedule for the dynamically generated personalized media content at the identified candidate time intervals in response to the received request. The play-out schedule of the dynamically generated personalized media content may include at least one of details of the user, a media distribution channel on which the programming media content is distributed, and other specified versions of the dynamically generated personalized media content scheduled for delivery at the client device in a defined sequence. The one or more processors may be further configured to determine the specified version of the programming media content viewed at the client device based on one or more user operations executed at the client device on the programming media content.

FIG. 1 is a block diagram that illustrates an exemplary network environment for client-side playback of personalized media content generated dynamically for various event opportunities in programming media content, in accordance with various exemplary embodiments of the disclosure. The client-side playback of personalized media content may be performed to facilitate a seamless user engagement with targetable programming and/or non-programming media assets personalized over a scalable on-demand media delivery platform on various client-end devices. The personalized media content may be generated dynamically for different event opportunities in the programming media content. With reference to FIG. 1, there is shown a network environment 100 that includes a media presentation and distribution system 102, a content delivery network (CDN) 104, a client device 106, a plurality of secondary devices 110 communicatively coupled to each other, via a communication network 112. In certain embodiments, a display device 108 may be externally coupled with the client device 106. Additionally, there is shown a user 114 who is associated with the client device 106 and the plurality of secondary devices 110.

The media presentation and distribution system 102 may comprise suitable, logic, circuitry, and interfaces that may be configured to manage requests and/or share operations of the client device 106 while handling client-side playback of personalized media content, generated dynamically for different event opportunities (for example, lull points, credits, product placement opportunities, etc.) in programming media content streamed at the client device 106. Additionally various requirements specified within the request may be managed by the media presentation and distribution system 102 to deliver the programming media content with or without non-programming media assets. Such management may ensure a seamless engagement and viewing experience of the user 114 with the programming media content. For such management, the media presentation and distribution system 102 may be configured to optimally distribute operations across sub-processing units of the media presentation and distribution system 102 and/or the client device 106. The operations of the media presentation and distribution system 102 may be further shared with the CDN 104 of the network environment 100, without a deviation from the scope of the present disclosure.

The CDN 104 may comprise suitable logic, circuitry, and interfaces that may be configured to store, distribute, cache, or host at least one segment of the programming media content for media streaming requests made to the media presentation and distribution system 102. Accordingly, the CDN 104 may be configured to facilitate delivery of one or more programs as the programming media content to a plurality of client devices (for example, the client device 106) that may communicate streaming requests to the media presentation and distribution system 102. The CDN 104 may serve as a distributed network of media servers, which may act as a curated repository of programs (encoded or uncompressed), for distribution to the media presentation and distribution system 102.

The CDN 104 may be configured to distribute the at least one segment of the programming media content, via one or more media access platforms (such as broadcast, live and IP-based platforms) for streaming requests made to the media presentation and distribution system 102. The CDN 104 may manage resources for a delivery channel that may be characterized by a frequency band for a broadcast delivery channel or an internet protocol address (IP address) for an IP-based delivery channel. Examples of the delivery channel may include, but are not limited to, a television channel, a radio channel, a webcasting channel, and an IP-based channel that may be hosted on a webpage or an application.

The client device 106 may comprise suitable logic, circuitry, and interfaces that may be configured to request the media presentation and distribution system 102 to stream programming media content at the client device 106 along with further requests for client-side playback of personalized media content. For example, a sports' match analysis presented as per user preference in a lull duration identified in a streamed sports match. Such personalized media content may be generated dynamically for various event opportunities in the programming media content, for example, television programming or on-demand shows (e.g. dramas, movies, etc.), at a display view of the client device 106. Examples of the client device 106 may include, but are not limited to, a Set-Top-Box (STB), an (internet protocol television) IPTV, a hybrid box, a cable converter, a smartphone, a laptop, and a tablet, a smart TV, a digital media player (for example, "Fire" TV, "Apple" TV, etc.).

In some embodiments, the client device 106 may facilitate playback of the programming media content via the display device 108 that may be peripherally integrated with the client device 106. Examples of the display device 108 may include, but not limited to a television display (e.g. Liquid Crystal Display (LCD), Light Emitting Diode (LED) display, organic light emitting diodes (OLED) display, plasma display, Thin-Film Transistor (TFT) display, etc.) a projector screen, a computer monitor, a three dimensional (3D) display, an (Augmented Reality/Virtual Reality (AR/VR display), and the like.

The plurality of secondary devices 110 may comprise suitable logic, circuitry, and interfaces that may be configured to receive and serve at least one notification or promotional content, via at least one delivery platform accessible on the plurality of secondary devices 110. The one or more delivery platforms may correspond to a communication exchange platform that may incorporate visual, audible, or executable data to provide at least one notification or associated promotional content to the user 114. Example of the one or more delivery platforms may include, but not limited to an Email platform, a mobile messaging platform, a webpage, a podcast, and a push notification. Examples of the secondary devices may include, but not limited to smartphones, tablets, phablets, smart watches, smart glasses, and smart speakers/with or without artificially intelligent (AI) conversational agents.

The communication network 112 may comprise suitable logic, circuitry, and interfaces that may be configured to provide a plurality of network ports and a plurality of communication channels for transmission and reception of communication data (for e.g. media streams, request data, metadata, database files, web data, etc.). The communication data may correspond to data received and/or exchanged among the media presentation and distribution system 102, the CDN 104, and the client device 106, via the communication network 112. Each network port may correspond to a virtual address (or a physical machine address) for transmission and reception of the communication data. For example, the virtual address may be an Internet Protocol version 4 (IPV4) or an Internet Protocol version 6 (IPV6) address, and the physical address may be a media access control (MAC) address. An application layer may be associated with the communication network 112 for implementation of communication protocols on one or more communication requests from at least one of the one or more computing devices. Examples of the communication protocol may include, but not limited to a Hypertext Transfer Protocol (HTTP), a File Transfer Protocol (FTP), a Simple Mail Transfer Protocol (SMTP), a Domain Name Server (DNS) protocol, and a Common Management Information Protocol (CMIP) Over Transmission Control Protocol/Internet Protocol TCP/IP (CMOT).

The communication data may be transmitted or received via at least one communication channel of the plurality of communication channels. The communication channels may include, but are not limited to, a wireless channel, a wired channel, a combination of wireless and wired channel thereof. The wireless or wired channel may be associated with a data standard which may be defined by one of a Local Area Network (LAN), a Personal Area Network (PAN), a Wireless Local Area Network (WLAN), a Wireless Sensor Network (WSN), a Wireless Area Network (WAN), and a Wireless Wide Area Network (WWAN). Additionally, the wired channel may be selected on the basis of bandwidth criteria. For example, an optical fiber channel may be used for a high bandwidth communication, and a coaxial cable (or Ethernet-based communication channel) may be used for moderate bandwidth communication. In one scenario, the communication network 112 may be an internet based network. For such networks, a delivery standard may be used, for example, National Television System Committee (NTSC), (Phase Alternating Line) PAL, Sequential Color with Memory (SECAM), Moving Picture Experts Group (MPEG), and (Digital Video Broadcasting) DVB-S/DVB-S2 or (Integrated Services Digital Broadcasting) ISDB-S. Although, only a single communication network has been illustrated in FIG. 1, there may be more than one communication networks that may or may not share resources to optimally deliver programming content and other non-programming content to various connected client devices.

In operation, a request may be transmitted by the client device 106 to the media presentation and distribution system 102, via the communication network 112. The request may be made for delivery and playback of personalized media content at the client device 106. The request may be transmitted by the client device 106 while the programming media content (for example, a weather news program is played on a news network streamed at the client device 106) is played (or ongoing) at the display of the client device 106. The request may include user intent information, constraint information (e.g. device constraints, network constraints, user-specified constraints, etc.), stored/collected user preferences (favorite shows, preferred products/services, frequently/recently searched terms, etc.), user attributes (e.g., demographic details (such as age, gender, income bracket, and location). The request may also include digital footprints (traceable, inferred, or analyzed digital activities, actions, contributions, and communications on internet or on digital devices (such as the client device 106 or the plurality of secondary devices 110).

In some embodiments, the client device 106 may be communicatively coupled to an application server (not shown) that acts as an intermediary between the client device 106 and the media presentation and distribution system 102. All the requests from the client device 106 may be parsed and/or routed by the application server to the media presentation and distribution system 102. An application manager (not shown in FIG. 1), at the client device 106, may further request authentication of the request from the media presentation and distribution system 102, via the application server. The request may correspond to an HTTP-based request via a transfer protocol, for example, HTTP live streaming protocol (HLS) for an internet-based media distribution channel.

The media presentation and distribution system 102 may be configured to receive the request from the client device 106, via the communication network 112. The request from the client device 106 may be authenticated and further the user intent information, the constraint information, the stored/collected user preferences, the user attributes, and the digital footprints in the authenticated request may be stored as request information (i.e., user specific information) at the media presentation and distribution system 102.

The media presentation and distribution system 102 may be further configured to identify at least one candidate time interval (hereinafter, "candidate time intervals") in the programming media content, while the programming media content is played at the client device 106. The identified candidate time intervals may correspond to event opportunity points within the programming media content. Each event opportunity point may indicate an opportunity to trigger an event in the playback duration of the programming media content that is streamed (i.e. an ongoing media streaming) at the client device 106. Such specified event within the programming media content may correspond to, but not limited to, start credits, end credits, lull points, time-based marked regions, location-based marked regions, context-based marked regions, explicit scene start and end, and product placement opportunities, within the programming media content.

In some embodiments, the candidate time intervals may be time slots in the programming media content that could be pre-defined prior to the delivery of the programming media content by the content provider (for example, the media presentation and distribution system 102) at the client device 106. For example, a pre-defined candidate time interval may be a duration of a pre-specified commercial POD (or a commercial break), or start/end credits of a program, specific durations for which an average viewership ratings (for example, Nielsen ratings) in the programming media content is low, and the like).

In other embodiments, the candidate time intervals may be specific time slots in the programming media content that are identified by analysis of different parameters in the stored request information received from the client device 106. Such candidate time intervals may include, but not limited to context specific points, lull points based on user footprints, activities (social, device, or app-based), identified points (or intervals) at which the user 114 may switch to different content on same delivery network or migrate to a different delivery network, and points based on past user migration and user attrition. The analysis by the media presentation and distribution system 102 may further lead to a determination of a type of personalized media content that can be suitably served at the client device 106 within the identified candidate time intervals. Such analysis may also lead to selection of different modifications in the display view that may be done in a personalized way at the client device 106 when the personalized media content may be presented with the programming media content. The display view may include a player and other options, and graphical/non-graphical elements displayed at a user interface (UI) of the client device 106.

The media presentation and distribution system 102 may be further configured to generate a personalized playlist that specifies different media assets that may be presented as a personalized media content at the identified candidate time intervals on the client device 106. The media presentation and distribution system 102 may schedule a play-out of each program within the personalized playlist. After such scheduling, the media presentation and distribution system 102 may be further configured to retrieve media content from a media store present in the media presentation and distribution system 102. The media content may also be retrieved from a content delivery network that is closest to the client device 106. The retrieved media content may correspond to at least one of a static type of media content or a dynamic type of media content (user interactive). The static type of media content may be a media content that do not include any option that is capable of receiving user input and user interactivity. The dynamic type of media content includes options or presents embedded UI elements capable of receiving user inputs and displaying response accordingly, and hence are user interactive. The media content may include at least one of programming media content (e.g., movies or shows trailers, program recap, programs to be aired, program highlights, sports highlight, sports analysis, news feed, or other short supplementary content, etc.) and non-programming media content (for example, video ads, audio ads, overlay graphic ads, or other promotional and/or supplementary content). The media content may be retrieved based on based on at least one of the user intent information and a plurality of targeting parameters associated with the user 114.

In some embodiments, the media content may be retrieved based on a defined criteria that may include, but not limited to a retrieved set of user-preferences, a defined goal in a flight, a measured or known attention span of the user 114, time constraints, inventory constraints, user-defined constraints, or a combination thereof. For example, the defined goal may include, but is not limited to a defined value of cost per thousand impressions (CPM), a click through rate (CTR), cost per sale (CPS), and a reach target. Similarly, the time constraints may include, but are not limited to a limited duration for which the user 114 may stay online and stream the programming media content, a limit to a total number of candidate time intervals in the programming media content, and an average attention span of the user 114. The limit on user availability for the duration of programming media content may also set a limit on the number of candidate time intervals in a limited duration of the programming media content. The inventory constraints may include, but are not limited to an availability of media content that can be presented in the identified candidate time interval and a limit on a number of media assets (in the retrieved media content) that matches up to the parameters in the user request information. The user-defined constraints may include but are not limited to, a constraint on number of advertisements, a constraint that specifies how many times alternate media can be presented onto the display during playback of the programming media content, and a content filter for a specific viewer (for example, filter content that is not intended for young kids and teenagers (below the age of 18 years).

The media presentation and distribution system 102 may be further configured to dynamically (i.e., in real time or near real time) generate personalized media content that corresponds to the identified candidate time intervals in the programming media content. The modification of the retrieved media content may be done in accordance with a specified version of the programming media content played at the client device 106 and at least one of the plurality of constraints for example, the user-defined constraints, the inventory constraints, or time constraints) associated with the user 114. In an embodiment, the modification to the retrieved media content may correspond to a trimmed version of the retrieved media content (or a compressed version), based on a removal of one or more frames, in the retrieved media content. In another embodiment, the modification to retrieved media content may correspond to fragmentation, rearrangement, or summarization of the retrieved media content into different clips of a duration that matches the duration of the identified candidate time intervals in the programming media content.

In some embodiments, the media presentation and distribution system 102 may also specify one or more tags that may be invoked at the client device 106 at the candidate time intervals. Such one or more tags may also indicate a type of modification and a media asset from the dynamically generated personalized media content that should be presented at the candidate time interval. Alternatively stated, each tag may include, but is not limited to, at least a pointer for a defined playback duration in a candidate time interval (e.g., "00:33:43"-"00:35:43" or "2 minutes" from "00:33:43"), a modification in a display view (e.g., split view, squeeze back, hot start, etc.), and a descriptor or a pointer to a corresponding media asset to be presented within the playback duration of the corresponding event opportunity point.

In some embodiments, the one or more tags may be transmitted along with a client manifest that may be created by the media presentation and distribution system 102 and transmitted to the client device 106 along with the dynamically generated personalized media content. The client manifest may be interpreted at the client device 106 and the one or more tags present along with the client manifest may be represented by at least one of a signal, a beacon, a SCTE-35 message, a marker, textual information, binary information, visual information, aural information, and the like.

The dynamically generated personalized media content may be encapsulated on a transport media stream, such as a Moving Pictures Experts Group-2 (MPEG-2) stream, which may be referred to as a media stream of the dynamically generated personalized media content. Additionally, the media presentation and distribution system 102 may generate at least one segment of the media stream prior to a play-out of the media stream to the client device 106. Metadata of the at least one segment of the first media stream and the one or more tags may be stored as client manifest within the media presentation and distribution system 102. The media stream and the client manifest may be transmitted to the client device 106.

The client device 106 may be configured to receive the media stream that includes the dynamically generated personalized media content and the client manifest for that media stream. As the dynamically generated personalized media content gets decoded at the client device 106, the media assets in the dynamically generated personalized media content may be identified for playback at the candidate time intervals in the programming media content by the client device 106. The client device 106 may be further configured to receive instructions from the media presentation and distribution system 102 that instructs playback of the dynamically generated personalized media content at the identified candidate time intervals. The playback may be instructed as per a specified version (live, linear, or non-linear) of the programming media content is played at the client device 106. In some cases, the instructions may specify whether to execute or to abandon the playback of the dynamically generated media content on the client device 106. The dynamically generated personalized media content may be presented at the candidate time intervals in the programming media content. In some embodiments, the client device 106 may modify the display view on the display device 108 for the identified candidate time intervals and present the dynamically generated media content in the modified display view. Such modification may be done in accordance with instructions from the media presentation and distribution system 102.

The dynamically generated media content may be concurrently presented with the programming media content (in squeeze back or split views) or may be exclusively presented as the only media content at the display view of the client device 106. The dynamically generated personalized media content is presented in the identified candidate time intervals such that an airtime efficacy of the candidate time intervals is maximized. The maximization of the airtime efficacy (or efficient airtime utilization) corresponds to an efficient utilization of a time window to air the media content (programming or non-programming) by maximization of time for which a target user is engaged with the media content throughout the playback time of the media content. Alternatively stated, the content provider would always prefer to have a continuous viewer engagement with the media content; however, the viewer may switch to different content on another network or may abandon the playback if the viewer finds something of less interest, which may lead to a decline in viewership and also a utilization of airtime. Therefore, the airtime efficacy is maximized by delivering alternative streams of personalized media content (programming or non-programming) that may be of interest to the viewer. The content provider will have a continuous engagement with the viewer and the viewer will watch what the viewer likes. The maximized airtime efficacy may increase a likelihood of user engagement and a user attention span with the generated personalized media content at the client device 106, while free up computational resources at the server side.

Figure 2:
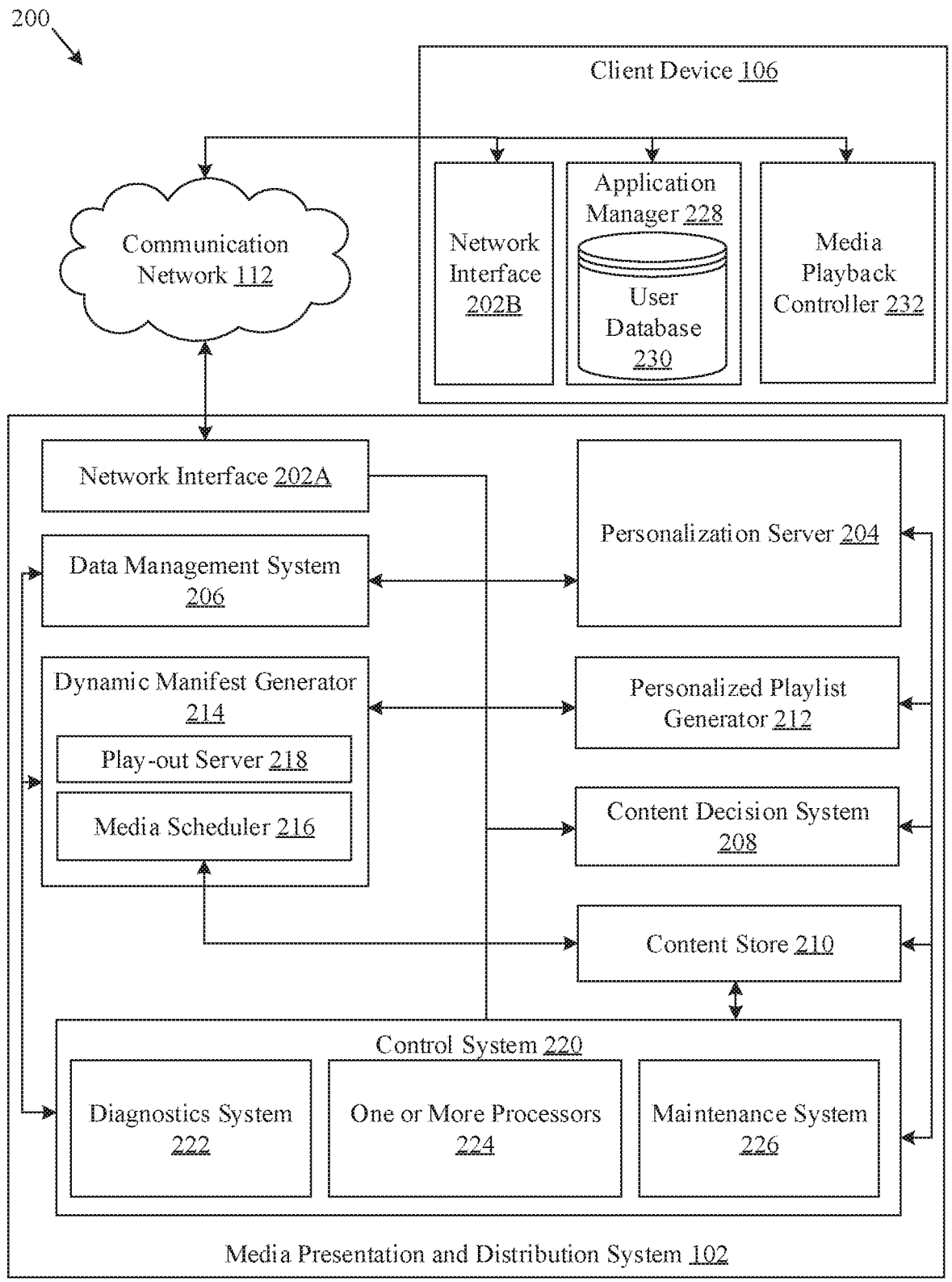
FIG. 2 is a block diagram that illustrates an exemplary media presentation and distribution system at a server-side that handles client-side playback of personalized media content generated dynamically for various event opportunities in programming media content, in accordance with an embodiment of the disclosure.

FIG. 2 is a block diagram that illustrates an exemplary media presentation and distribution system (at a server-side) that handles client-side playback of personalized media content generated dynamically for various event opportunities in programming media content, in accordance with an embodiment of the disclosure. With reference to FIG. 2, there is shown a block diagram 200 of the media presentation and distribution system 102 along with the client device 102 that is communicatively coupled to the media presentation and distribution system 102, via the communication network 112. The media presentation and distribution system 102 may include a network interface 202A, a personalization server (PS) 204, a data management system (DMS) 206, a content decision system (CDS) 208, a content store (CS) 210, a personalized playlist generator (PPG) 212, a dynamic manifest generator (DMG) 214, and a control system 220. The DMG 214 may include a media scheduler (SS) 216 and a play-out server (PLS) 218. Similarly, the control system 220 may include the diagnostics system 222, the one or more processors 224, and a maintenance system 226. The client device 106 may include a network interface 202B, an application manager 228 that includes a user database 230, and a media playback controller 232.

The operation of aforementioned components may be executed by the one or more processors 224 present in the control system 220. The one or more processors 224 may operate on instructions that may be stored in a memory (not shown in FIG. 2) present on the media presentation and distribution system 102.

The network interface 202A may comprise suitable logic, circuitry, and interfaces that may be configured to communicate with various operational components within the media presentation and distribution system 102. The network interface 202A may be implemented by use of known technologies to support wired or wireless communication of the various operational components of the media presentation and distribution system 102 with peripheral components, such as the client device 106. Similarly, the network interface 202B may be configured to communicate with various computing components within the client device 106. The network interface 202B may be implemented by use of known technologies to support wired or wireless communication of the various computing components of the client device 102 with remote components, such as the media presentation and distribution 102. Components of the network interface 202A or the network interface 202B may include, but are not limited to, an antenna, a radio frequency (RF) transceiver, one or more amplifiers, a tuner, one or more oscillators, a digital signal processor, a coder-decoder (CODEC) chipset, and/or a local buffer circuitry.

The PS 204 may comprise suitable logic, circuitry, and interfaces that may be configured to operate as a communication interface between the (client-side) application manager 228 at the client device 106 and the DMS 206 at the server-side. The PS 204 may be specifically configured to communicate, via the network interface 202A, with the client device 106. The PS 204 may be configured to receive and parse a user request from the client device 106 and different parameters of the request information received with the user request. In one embodiment, the PS 204 may be implemented on a cloud server that allocates at least a portion of the computational resources and/or network resources (e.g., bandwidth, ports, threads, etc.) to the PS 204. In another embodiment, the PS 204 may be implemented as a set of instructions on a network circuitry that may be accessible through a centralized or decentralized service, via the communication network 112.

The DMS 206 may comprise suitable logic, circuitry, and interfaces that may be configured to store, collate, and assimilate data, associate relationships within stored data of the user 114 or the received request information in the user request. The DMS 206 may be a data cloud that may include, but not limited to user-preferences, likes, dislikes for different types of media content (programming and/or non-programming), bio data (e.g., gender, age bracket, etc.), financial information (income bracket), and user spending data, and other demographic details. In one embodiment, the DMS 206 may also be implemented on a cloud server that allocates at least a portion of the computational resources and/or network resources (e.g., bandwidth, ports, threads, etc.) to the DMS 206. The DMS 206 may include a user database. The user database may be configured to store and update records based on the request information received along with the user request.

The CDS 208 may comprise suitable logic, circuitry, and interfaces that may be configured to identify an available set of media assets (programming and/or non-programming) that match the parameters in the request information received with the request from the client device 106. The available set of media assets may be identified from a curated repository of media content (programming and non-programming assets) in the CS 210. In some embodiments, the CDS 208 may be further configured to perform ranking of the identified set of media assets media, sorting of the identified set of media assets (programming and/or non-programming) for the user 114, and selection of one or more media assets from the set of media assets. After selection, the CDS 208 may be configured to obtain or negotiate content rights, permissions, or certificates for the selected one or more of the set of media assets (programming or non-programming) for a play-out on the client device 106. The CDS 208 may be communicatively coupled with the PPG 212, and further configured to transmit the selection for the one or more programs to the PPG 212.

The CS 210 may comprise suitable circuit, interface, may comprise suitable logic, circuitry and interfaces that may be configured to store and manage an inventory of programming media assets (e.g., television shows, movies, trailers, promos, recaps, etc.) and non-programming media assets (e.g., video advertisements, promos, overlay graphics, ad banners, bugs (e.g., channel bugs, product bugs, etc.). The CS 210 may also store rights, certificates, or licenses associated with the inventory of programming media assets and non-programming media assets. Such rights, certificates, or licenses may be invoked or validated at a playback time of personalized media content that is dynamically generated based on the selected one or more from set of media assets.

The PPG 212 may comprise suitable logic, circuitry, and interfaces that may be configured to generate a personalized playlist from the selection of one or more media assets (programming and/or non-programming) from the set of media assets. The PPG 212 may be configured to communicate the personalized playlist to the DMG 214.

The DMG 214 may comprise suitable logic, circuitry, and interfaces that may be configured to dynamically generate the personalized media content from the selected one or more media assets (programming and/or non-programming), based on the generated personalized playlist by the PPG 212. The DMG 214 may be further configured to encode the generated personalized media content and encapsulate (and transcode) the encoded personalized media content onto a media stream (for e.g., an MPEG-2 stream). The personalized media content is prepared by retrieval of the media content (that includes programming and/or non-programming assets) from the CS 210 (also referred to as a media store) and/or the CDN 104 associated with the media presentation and distribution system 102. The DMG 214 may be further configured to dynamically generate a client manifest that may determine a type of media stream, i.e., live, linear, VOD, or a combination thereof, that should be transmitted to the client device 106 in response to the request from the client device 106 for play-out with the currently streamed programming media content.

The SS 216 may comprise suitable logic, circuitry, and interfaces that may be configured to schedule, encode, and package a list of selected media assets specified in a sequence in the personalized playlist for play-out to the client device 106. The SS 216 may be configured to retrieve the media content (selected media assets) as per a scheduled play-out of the programming media content and dynamically generate the personalized media content that is scheduled for playback at candidate time intervals in the programming media content. The SS 216 may be further configured to generate a play-out schedule for the dynamically generated personalized media content and transmit the dynamically generated personalized media content along with the play-out schedule to the PLS 218.

The PLS 218 may comprise suitable logic, circuitry, and interfaces that may be configured to encapsulate the dynamically generated personalized media content on a transport stream (or a media stream) and transmit the media stream (in segments or whole) to the client device 106, via the communication network 112. The PLS 218 may be further configured to encrypt and transmit the media stream to the client device 106, via the network interface 202A. In some embodiments, the PLS 218 may also be configured to transcode the dynamically generated media content between different formats, for example, between H.264 video and AAC audio for internet based play-out and MPEG-2 TS for broadcast delivery. Also, in some cases, the PLS 218 may transrate, transmux, transize, or segment the dynamically generated personalized media content to adaptively stream to the client device 106 in accordance with bandwidth constraints and device constraints of the client device 106.

The control system 220 may comprise suitable logic, circuitry, and interfaces that may be configured to monitor, instruct, and calibrate operations of each component of the media presentation and distribution system 102, via at least one control signal. Each component may be monitored, instructed, and calibrated for synchronized and lag-free operations for the requests received from the client device 106. The control system 220 may comprise a monitoring system (not shown in FIG. 2), a command and control system (not shown in FIG. 2), the diagnostics system 222, the one or more processors 224, and a maintenance system 226.

The diagnostics system 222 may comprise suitable logic, circuitry, and interfaces that may be configured to execute diagnostic checks (at run time and/or at scheduled time-stamps) of different components in the media presentation and distribution system 102. Such diagnostic checks may be further utilized to identify and rectify bugs, performance issues, data integrity loss, security issues, and the like. The one or more processors 224 may comprise suitable logic, circuitry, and interfaces that may be configured to generate and issue commands to instruct a flow of operations of each component of the media presentation and distribution system 102, via the issued commands. The maintenance system 226 may comprise suitable logic, circuitry, and interfaces that may be configured to perform various operational and maintenance activities of each component of the media presentation and distribution system 102.

The application manager 228 may comprise suitable logic, circuitry, and interfaces that may be configured to manage real time playback requirements of the client device 106. The real time requirements may include media player initialization, setup, network access, background streaming, data exchange between the client device 106 and the media presentation and distribution system 102. The application manager 228 may manage different resources that are available for utilization in response to user inputs and/or requests (or instructions) from the media presentation and distribution system 102. The application manager 228 may include the user database 230. The application manager 228 may be further configured to manage processes and/or requests that may be associated with the user preferences, activities (or footprints), interaction, or profile of the user 114. Such preferences, activities, interaction, or profile may be stored and managed as user-related data in the user database 230. The user-related data may be stored as a structured and relational data, or an unstructured and non-relational data in the user database 230. Every time the user 114 requests, via the client device 106, to access the preferred programming media content, the request may be stored by the application manager 228.

The user database 230 may be configured to store and manage the user-related data in real-time. The user-related data may include at least a set of user-authentication data, subscription data, one or more user-preferences, and associated interactions with the presented one or more non-programming media assets at the client device 106. A footprint of the user 114 defines the activities of the user 114 that may be stored in the user database 230 in real-time.

The media playback controller 232 may comprise suitable logic, circuitry, and interfaces that may be configured to execute different operations (for e.g., media decoding, graphic rendering, instructions-based on-screen actions, etc.) for the playback of the programming media content or the dynamically generated personalized media content at the client device 106.

In operation, the media presentation and distribution system 102 may be configured to receive a request from the client device 106, via the communication network 112. The received request may correspond to a request for playback of personalized media content at different event opportunities (i.e., the identified candidate time intervals) in the programming media content that is streamed and played at the client device 106. The programming media content that the user 114 may be engaged with at the client device 106 may be a VOD programming media content, a live programming media content, a linear programming media content, or a combination thereof. Such programming media content may be personalized for the user 114 or may be a broadcasted feed that is delivered through a network-based delivery channel, for example, via an internet-based HLS protocol.

The received request may include the request information. The request information may include user intent information, constraint information (e.g. device constraints, network constraints, user-specified constraints, etc.), stored/collected user preferences (likes, dislikes, favorite shows, preferred products/services), frequently/recently searched terms, etc.), user attributes (e.g., demographic details (such as age, gender, income bracket, and location). The request information may also include digital footprints (traceable, inferred, or analyzed digital activities, actions, contributions, and communications on internet or on digital devices (such as the client device 106 or the plurality of secondary devices 110).

The request information may further include a user identifier (UID), a client ID (CID) associated with the client device 106, a network configuration, a network (internet protocol) IP address, a device IP address, client device type, and a plurality of targeting parameters associated with the user 114. The plurality of targeting parameters associated with the user 114 may include at least one of user preferences, a user profile, demographic details, historical preferences, a time of day, a time of next event, and a plurality of external inputs received from the application manager 228 executed at the client device 106. The plurality of external inputs may include, but not limited to at least one of a calendar schedule of the user 114, local weather conditions, a boarding pass of the user 114, a geographical location of the user 114, and a local traffic report. The constraints information may include a content constraint, a media format constrain, a time constraint, an inventory constraint, or a device constraint (as described in FIG. 1). The user intent information may include at least one of event information, situation information, or circumstance information associated with user engagement with the programming media content streamed in real time at the client device 106.

The network interface 202A may route the received request along with the request information to the PS 204. The PS 204 may be configured to extract parameters from the received request and the request information. Optionally, the PS 204 may parse the parameters in the received request from the client device 106. The PS 204 may operate as a front-end of the DMS 206 and communicate the parsed parameters to the DMS 206 and the CDS 208. In some embodiments, the PS 204 may further include a catalogue store (not shown). The catalogue store may include a VOD catalogue of available programming media content and a live catalogue society of cable telecommunication engineers (SCTE)-224 schedule) of available programming media content.

The DMS 206 may be configured to store, collate, or update the parsed parameters to a user database managed specifically for requests from the client device 106 associated with the user 114. The parsed parameters may define granular relationships among different interests, likes, dislikes, constraints, and other user-related or device-related parameters. Therefore, in some embodiments, the DMS 206 may be configured to generate semantic relationship models (shallow or deep) based on associations built among the granular relationships built among different parsed parameters in the received request and the request information. The DMS 206 may be further configured to determine a specified version of the programming media content viewed at the client device 108 based on different user operations executed at the client device 106 on the programming media content.

In some embodiments, the DMS 206 may generate a data cloud of the one or more preferences, likes, dislikes, or other user attributes, such as demographic details, financial information, location, for the different programming and/or non-programming content types that can be presented at different candidate time intervals in the programming media content, streamed at the client device 106. The data cloud may be generated from sources, such as social media footprints, web footprints, searches, past engagements with the programming media content, and specific interactions with the client application on the client device 106.

For example, for a user "Alex", the DMS 206 may receive a parsed request parameter that comprises a preference for a "lifestyle" genre, associated with searched keywords "Travel" and "Food". The DMS 206 may retrieve the set of user-preferences associated with the searched keywords or the request parameter. Based on the retrieved set of user preferences, the DMS 206 may infer that "Alex" has a liking for "Paris", "Atlanta", and "Street Food" and a preference for "sea-based locations". The DMS 206 may identify that "Alex" dislikes "Meat Products" and "Cheese Products" from social media footprints. Therefore, the DMS 206 may generate a relationship model that may be used to ascertain that "Alex" may be a "Vegan" and may be served with personalized media content that may promote or showcase vegan food around the preferred travel location.

Each preference, like, or dislike may be factored as one or more features for a certain semantic relationship model and each relationship model may be generated based on factoring the one or more features, which may be "1000" or even "10000" for a given scenario. Accordingly, the DMS 206 may further update records for the parsed parameters, and the generated relationship models within the user database. Data associated with the user 114 may be shared by the DMS 206 with the PS 204 in response to request received from the PS 204.

The CDS 208 may be further configured to identify candidate time intervals in the programming media content that may be streamed at the client device 106, based on an analysis of the received request and the request information received along with the request. For example, the CDS 208 may take different constraints specified in the constraint information, user preferences, and other parameters to identify points in the programming media content that could be served with an alternate media stream that is personalized for the user 114.

The candidate time intervals may correspond to event opportunity points, which may pre-specified or identified based on analysis of the programming media content. Such event opportunity points may correspond to a specified event within the programming media content and such specified event may correspond to, but not limited to start credits, end credits, lull points, time-based marked regions, location-based marked regions, context-based marked regions, explicit scene start and end, and product placement opportunities, within the programming media content. In some cases, a user may switch early on a streaming network (e.g., "5 minutes" prior to the playback of user's favorite show that may be aired at a certain time). In such cases, the duration of "5 minutes" may be considered as a candidate time interval to present a personalized media content that matches the user attributes and satisfies different parameters in the received request.

In one embodiment, the CDS 208 may be further configured to determine a first time interval, a second time interval, and a third time interval based at least on a contextual analysis of the programming media content at the client device 106 or tags associated with a plurality of segments of the programming media content. In one case, the identified candidate time intervals may correspond to the first time interval prior to a start of the programming media content, a second time interval during playback of the programming media content, or a third time interval at an end of the programming media content. In another case, the first time interval, the second time interval, and the third time interval in the programming media content may correspond to at least one of a start credit, an end credit, an ad break, tagged media content, or a lull point in the programming media content.

In accordance with an embodiment, the candidate time intervals (i.e., the event opportunity points) may be further identified based on content recognition of the programming media content that is streamed at the client device 102. The content recognition may be executed at the client device 106 and logs generated from that may be communicated to the CDS 208. Alternatively, the content recognition may be executed on the media presentation and distribution system 102 on the same programming media content that is currently being transmitted at the client device 106. In accordance with another embodiment, the CDS 208 may be configured to identify the candidate time intervals in the programming media content, based on semantic or context mining of different scenes or user activities with different scenes in the programming media content.

In accordance with an embodiment, the candidate time intervals may be further identified based on a degree of a correlation of different parameters in the request information or different user attributes with different scenes in the programming media content. In accordance with yet another embodiment, the one or more non-programming media assets may be identified based on one or more goals defined by the GMS 240. Example of the one or more goals may include, but are not limited to, impressions, reach, clicks, views, and sales for the offerings associated with the one or more non-programming media assets.

The CDS 208 may be further configured to identify available one or more media assets (such as programming and/or non-programming media assets) that may bear a correlation with the parsed parameters in the request information and/or the relationship models generated based on the request information. For such identification, in one implementation, the CDS 208 may search for available one or more media assets (programming and/or non-programming) within a curated repository of programs in the CS 210. In other implementation, the CDS 208 may utilize the catalogue store to search for one or more media assets (programming and/or non-programming) within a curated repository of programs in the CS 210. Also, the CDS 208 may search for one or more media assets (programming and/or non-programming) in media servers of the CDN 104 (of third party networks, such as ad networks). The CDS 208 may identify one or more media assets (programming and/or non-programming) for the user 114, based on the user intent information, the constraint information, the user attributes, targeting parameters, applicable content rights, certificates, and licenses, and other parsed parameters specified in the request information.

After identification of one or more media assets (programming and/or non-programming), the CDS 208 may be configured to obtain or negotiate content rights, permissions, or certificates for the identified one or more media assets (programming and/or non-programming) for play-out to the client device 106. The content rights, permissions, or certificates for the identified one or more media assets (programming and/or non-programming) may be obtained from the assets and rights database in the CS 210. In other words, the CDS 208 may identify the one or more media assets (programming and/or non-programming) that can be served as an alternate stream of personalized media content (preferred by the user 114). The identification may be further done with due consideration to actual user requirements and to allow the user 114 to seamlessly engage with different content delivered from the same content delivery network (for example, the CDN 104). The CDS 208 may be further configured to communicate information that includes the identified media assets (programming and/or non-programming) to the PPG 212.

The PPG 212 may be configured to receive the communicated information that includes the identified media assets (programming and/or non-programming) from the CDS 208. The PPG 212 may be further configured to generate a personalized playlist of the identified media assets (programming and/or non-programming). In some cases, multiple personalized playlists may be generated as a recommended sequence that includes different combinations (alternative stream options for the user 114) of the identified media assets (programming and/or non-programming). In an exemplary scenario, the user 114 may be presented with one or more recommended sequences at the client device 106. Based on a selection of a recommended sequence from the presented one or more recommended sequences, the PPG 212 may communicate the personalized playlist of the one or more programs to the DMG 214.

The SS 216 in the DMG 214 may be further configured to retrieve media content (programming and/or non-programming) from a media store (i.e. the content store 210) in the media presentation and distribution system 102. The retrieved media content may be same (or different) as that specified in the identified media assets (programming and/or non-programming) and the generated personalized playlist (or a user-selected recommended sequence). The media content may be retrieved based on at least one of, but not limited to the user intent information, the constraints information, the user attributes, the plurality of targeting parameters, and other parameters stored in the user database or received with the request from the client device 106. The retrieved media content may correspond to at least one of a static type of media content or a dynamic type of media content.

The SS 216 may be further configured to dynamically generate personalized media content that corresponds to one or more of the candidate time intervals in the programming media content viewed at the client device 106. The personalized media content may be dynamically generated based on a modification of the retrieved media content in accordance with a specified version of the programming media content played at the client device 106 and at least one of the plurality of constraints (specified in the constraints information) associated with the user 106. The personalized media content may include a modified form of the identified media assets (specified in the personalized playlist) that may be dynamically generated based on based on at least the plurality of constraints. The modified form of the identified media assets in the dynamically generated personalized media content may correspond to a trimmed version of the retrieved media content or a compressed version, based on a removal of one or more frames, from the retrieved media content. The dynamically generated personalized media content may further include at least one segment of the retrieved media content and at least one of media transitions, pre-encoded video-on-demand (VOD) assets, live content, a media clip, or a media highlight.

The SS 216 may be further configured to schedule, encode, and package the dynamically generated media content for play-out to the client device 106. The dynamically generated personalized media content that is prepared by the SS 214 may include, but is not limited to VOD media content, linear media content, live media content, VOD to VOD programming media content, VOD to live programming media content, live to live programming media content, live to VOD programming media content, or different combination thereof. Such diverse types of programming media content may be generated based on implementation of functions on dynamically modifiable manifest information generated at the DMG 214. The dynamically modifiable manifest information may be a client manifest that is initially generated for a specific type of stream (e.g., VOD stream) but may be modified at the media presentation and distribution system 102 or at the client device 106 to a client manifest for a different type of stream (e.g., a live or linear stream). The SS 216 may be further configured to generate a play-out schedule for the dynamically generated personalized media content. The play-out schedule of the dynamically generated personalized media content may include at least one of details of the user 114, a media distribution channel on which the programming media content is distributed, and other specified versions of the dynamically generated personalized media content scheduled for delivery at the client device 106 in a defined sequence. The SS 216 may be configured to transmit the dynamically generated personalized media content along with the play-out schedule to the PLS 218.

Hereinafter, some exemplary scenarios are specified with reference to two different users who have different attributes. In a first example, a first user "Anthony" may have user attributes (including preferences of the first user, e.g., "Anthony") given in Table 1, as follows:

TABLE 1

| User Attributes | |
|---|---|
| Age | 25 |
| Gender | Male |
| Location | New York, NY |
| Marital Status | Single |
| Children | 0 |
| Occupation | Student |
| Income | USD 0 |
| Genres Affinities | Action, Horror, Sports, Animation, Science Fiction |
| Sports Teams | Kentucky Wildcats Basketball, New York Yankees, New York Knicks, Optik Gaming |
| Favorite Programs | The Detour, Animal Kingdom, Rick and Morty, Impractical Jokers, NBA on TNT, Eleague, The Walking Dead, Myth Busters |

With reference to the first example, based on analysis of different parameters in the request information and the user attributes, the CDS 208 may determine that the "Anthony" is highly likely to view a program (e.g., "Eleague"), on a linear network, but "Anthony" has logged in to the linear network "3 minutes" prior to the broadcast of the program (e.g., "Eleague") and another program is currently played on the linear network (which is of no interest to "Anthony"). Therefore, the CDS 208 may identify those "3 minutes" to be a candidate time interval (an event opportunity) to present an alternate stream that may be of interest to "Anthony". The alternate stream may include the dynamically generated personalized media content, for e.g., a recap of a previous episode of the program (e.g., "Eleague").

With modern set-top box (a type of the client device 106) configured to support short form of media content as served by, for example, different streaming applications and casual gaming applications, the client device 106 may be present with personalized media content generated dynamically to fill the next few minutes before the program (e.g., "Eleague") starts as opposed to starting a program that "Anthony" may not view in its entirety.

Based on received request information, the CDS 208 may determine that "Anthony" is a Kentucky fan as well as an NBA fan. The CDS 208 system may determine to show some highlights of former Kentucky players doing well in the NBA at a candidate time interval (e.g., a lull period in an NBA match) in the programming media content. After the highlights end, the playback of the program (e.g., "Eleague") may start. Additionally, the CDS 208 may decide to advertise on different event opportunities by showing player stats page featuring results from last night's game along with the highlights.

The SS 216 may be configured to dynamically generate custom video clips of different lengths for different types of audiences and email to the audience corresponding links offering a new content monetization opportunity for a broadcaster and a means to both gather potential viewer data and engage current and new viewers. While the client device 106 may play the highlights by default, "Anthony" may be given an option of an easy access to the live linear programming content from within the recommendation list displayed on a lander page at the client device 106. The lander page may be a specific page that is displayed when a user logs in and accesses an application or a webpage. The lander page may include notifications, recommendation panels, and a currently broadcasted programming content through the CDN 104. The notification service (at the media presentation and distribution system 102 or at the client device 106) may be configured to transmit a notification as a reminder that the program (e.g., "Eleague"), will be starting shortly, and the "Anthony" is logged in at the right time.

In some cases, for example, during an end credit squeeze back, an ad for an upcoming release of a new movie may be displayed on a defined portion (e.g. the right side) of the display screen of the client device 106, with a call to action to buy tickets. As the program (e.g., "Eleague") broadcast begins but before the competition starts, a "low point squeeze back ad" may be displayed for a pre-game show sponsor, for example "a chocolate brand". Such low point squeeze back ad may allow the content provider (or the ad network) to take advantage of low points in activity or plot lines to monetize programming without exclusion of "Anthony" entirely from the engagement with the programming content.

In a second example, a second user "Fabiola may have user attributes (including preferences of "Fabiola") given in Table 2, as follows:

TABLE 2

| User Attributes | |
|---|---|
| Age | 34 |
| Gender | Female |
| Location | Los Angeles, CA |
| Marital Status | Married |
| Children | 2 |
| Occupation | Marketing Director |
| Income | USD 125-150K |
| Genres Affinities | Romantic, Comedy, Documentary, Musical, Film Noir |
| Sports Teams | Los Angeles Lakers |
| Favorite Programs | Law and Order SVU, Wrecked, This is Us, The Voice, Master Chef, Quantico, The Last Ship, One Day at a Time |

With reference to the second example, the PS 204 may determine that "Fabiola" is a fan of a first program (e.g., "Wrecked"), broadcasted by a network, for example "TBS". The CDS 208 may determine that "Fabiola" is a fan of the first program and has been watching the current season of the first program. "Fabiola" has missed (or fallen) an episode behind the live linear broadcast of the first program and therefore, the CDS 208 may, based on previous viewing profile, default to a stream that starts with the next VOD episode in the season to help "Fabiola" catch-up with a missed episode from the first program.

In some cases, a recommendation of a movie may be provided at a candidate time interval during the playback of the first program. "Fabiola" may see the recommendation for the movie and decide to watch the movie. The CDS 208 may suitably generate alternate stream with the recommended movie and stream the movie to the client device. As the movie begins and a promo graphic of a broadcaster, such as "TBS", appears in the lower right-hand corner of the screen on the client device 106. As "Fabiola" watches the movie, a sponsor bug may replace the "TBS" logo bug that indicates a sponsorship opportunity.

In another case, based on analysis of the user attributes and request information, the CDS 208 may determine that "Fabiola", who lives in, for example California, is an avid viewer of a specific news channel. With severe weather warning taking place due to massive flooding, the CDS 208 may decide to display a notification that may alert "Fabiola" to Breaking News Event about the flooding in California. In one scenario, the display view may split into two and "Fabiola" may see both the Breaking News Event and a movie from two different networks at the same time. In another scenario, a watch now button may be enabled on the display view on the client device 106 and upon selection of the watch now button by "Fabiola", the current stream may be automatically switched over to an alternative stream for the Breaking News currently in progress. After the alternative stream is selected, the previous stream (or program in the previous stream may be added to a watch list for "Fabiola".

In a third example, an episode of a kids cartoon program may include a starting credit and an ending credit for a production company, and crew behind the episode, a first lull point where a character is constantly running for "1 minute", a second lull point where a character is standing still for "40 seconds", and a contextually relevant point where another character is having dog food.

In a fourth example, an episode of a prime-time news program may be based on a debate between an anchor and one or more participants. Such episode may include end credits for the news cast, a first lull point at a time when the anchor is waiting for the one or more participants to speak, a second lull point when a participant is engaged in an irrelevant discussion with other participants or the anchor, and a contextually relevant point when the news anchor sips a cup of coffee.

With reference to third example and the fourth example, the CDS 208 may be configured to identify information associated with an advertisement for a dog food offering at the lull point within the episode of the kids cartoon program. The CDS 208 may be configured to identify information associated with another advertisement for a coffee offering for the contextually relevant point in the prime-time news program. The CDS 208 may also identify information associated with a promotional trailer of a new movie at the lull points and a recap of the next program at the credit points within the episode. Therefore, the CDS 208 may decide to present an alternative ad stream of the dog food offering at the lull point within the episode of the kids cartoon program and another alternative ad stream of the coffee offering for the contextually relevant point in the prime-time news program.

An event opportunity server (not shown in FIG. 2)) may be further configured to instruct playback of the dynamically generated personalized media content at the identified candidate time intervals as per the specified version of the programming media content played at the client device 106. The instructed playback may correspond to decisions taken by the event opportunity server. Such decisions may include whether to present or not present an alternative stream of dynamically generated personalized media content and if yes, then how to present the alternative stream, and at what time? The dynamically generated personalized media content may be presented at the identified candidate time intervals such that an airtime efficacy of the at least one candidate time interval is maximized. The maximized airtime efficacy increases a likelihood of user engagement and a user attention span with the generated personalized media content at the client device 106.

The packaged programming media content of the one or more programs may be transmitted to the PLS 218. A request, from the PLS 218, for generation and insertion of the one or more tags at the candidate time intervals within the dynamically generated personalized media content may be transmitted to a tagging system (not shown in FIG. 2). Such tags may be invoked at the client device 106 during play-out of the programming media content and therefore, may facilitate enablement of modifications in the display view of the client device 106 and concurrent presentation of the dynamically generated personalized media content, such as advertisements, promos, trailers, and recaps, along with the programming media content.

An encapsulation may be performed by the PLS 218 on the dynamically generated personalized media content, as received from the SS 216, to obtain an alternative media stream for the programming media content. The PLS 218 may encrypt the alternative media stream for secure play-out at the client device 106 associated with the user 114. The encrypted media stream may be segmented by the PLS 218 into one or more segments, and such encrypted media stream may be segmented to facilitate adaptive bitrate streaming (ABS) over to the client device 106, via the communication network 112 depending on an availability of network bandwidth for the client device 106. The PLS 218 may be further configured to generate a client manifest that may correspond to a data structure for at least the one or more tags, uniform resource identifiers (URIs) for the one or more segments, URIs for the one or more non-programming media assets, metadata for the tags, and the like. The client manifest may be transmitted along with the alternative media stream to the client device 106, via the communication network 112.

The PLS 218 may be configured to transmit the encrypted alternative media stream, inserted with the one or more tags, to the client device 106, via the communication network 112. The transmission of the encrypted alternative media stream to the client device 106 may be executed via one of the HLS technique, the DASH technique, or any suitable digital streaming technique.

At the client device 106, the application manager 228 may be configured to manage a receipt of the alternative media stream of the dynamically generated personalized media content at the client device 106. The application manager 228 may communicate the received client manifest and playback information to the media playback controller 232. The playback information may include, but is not limited to the identified candidate time intervals, pointers to assets that may be retrieved from the alternative media stream and played at the candidate time intervals, and modification instructions. In one embodiment, the media playback controller 232 may be configured to generate notifications or recommendations of the dynamically generated personalized media content and serve the notifications onto the display view of the client device 106. Upon user-selection, the media playback controller 232 may either switch to the dynamically generated personalized media content from originally played programming media content or modify the display view to support concurrent playback of both the dynamically generated personalized media content and the programming media content. Prior to modification, in some embodiments, the application manager 228 may be configured to seek permissions/rights from the event opportunity server as well as the user 114 to apply the modification(s) to the display view of the client device 106.

The operations of each component of the media presentation and distribution system 102 may be monitored, instructed, and calibrated, via at least one control signal, by control system 220. Each component may monitored, instructed, and calibrated for synchronized and lag-free operations for the requests received from the client device 106.

Figure 3:
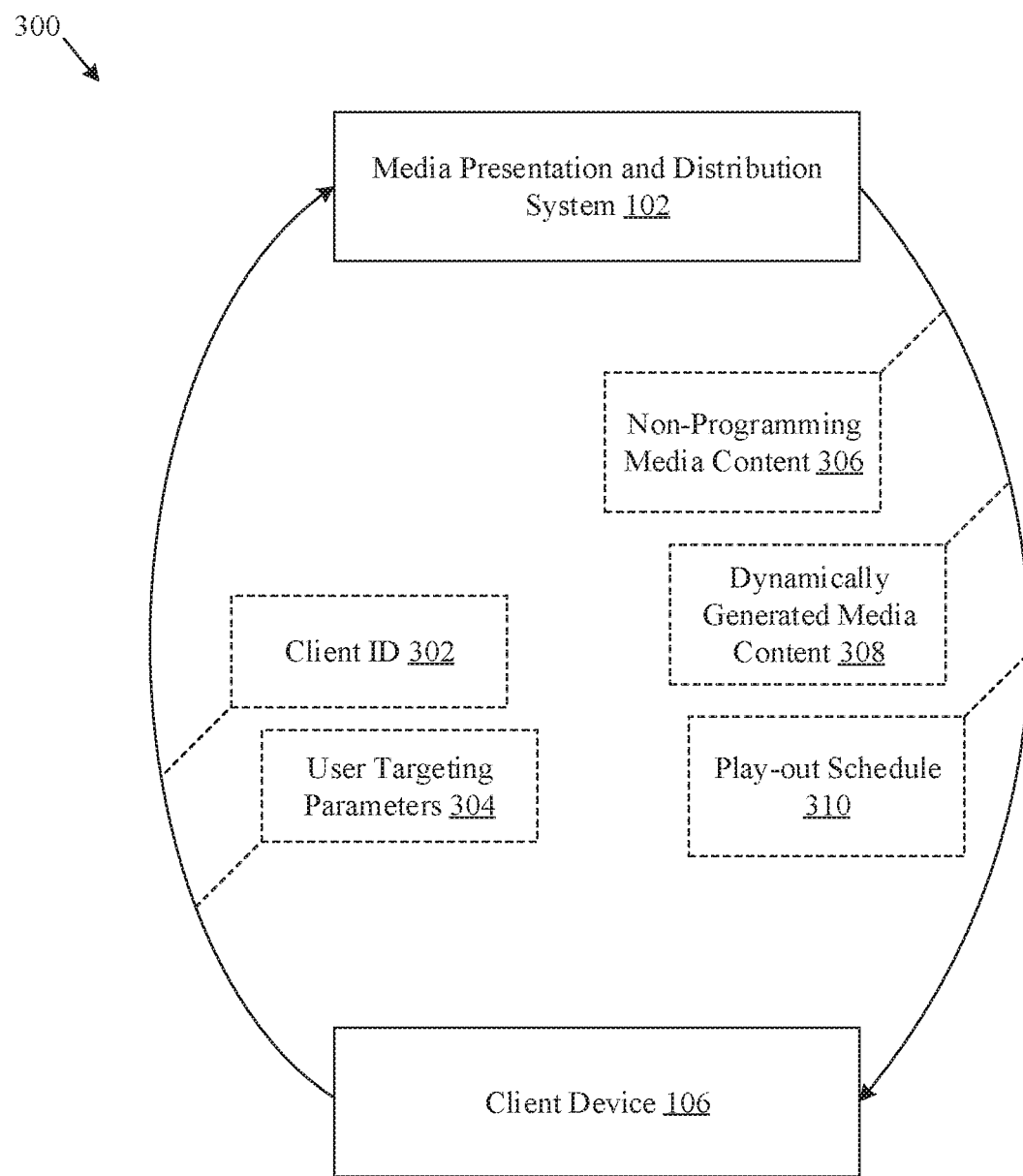
FIG. 3 is a flow diagram that illustrates data exchange between the exemplary media presentation and distribution system of FIG. 2 and the client device, with client-side playback of personalized media content generated dynamically for various event opportunities in programming media content, in accordance with an embodiment of the disclosure.

FIG. 3 is a flow diagram that illustrates data exchange between the exemplary media presentation and distribution system of FIG. 2 and a client device, for client-side playback of personalized media content at various event opportunities in programming media content, in accordance with an embodiment of the disclosure. FIG. 3 is explained in conjunction with elements from FIG. 1 and FIG. 2. With reference to FIG. 3, there is shown a flow diagram 300 that specifies an exemplary sequence of data exchange between the media presentation and distribution system 102 and the client device 106. In the flow diagram 300, there is further shown a client identifier (ID) 302, a plurality of user targeting parameters, such as user targeting parameters 304), non-programming media content 306 (e.g., video advertisements, overlay ads, bugs, audio ads, etc.), personalized media content, such as the dynamically generated media content 308, and a play-out schedule 310 of the personalized media content (such as the dynamically generated media content 308).

Initially, the client device 106 transmits a request that include request information for playback of personalized media content at candidate time intervals. The request information may include the client ID 302 and the user targeting parameters 304. The user targeting parameters 304 associated with the user 114 may include at least one of user preferences, a user profile, demographic details, historical preferences, time of day, time of next event, and a plurality of external inputs received from the application manager 228 executed at the client device 106. The request information may further include user intent information, constraint information (e.g. device constraints, network constraints, user-specified constraints, etc.), stored/collected user preferences (likes, dislikes, favorite shows, preferred products/services), frequently/recently searched terms, etc.), and user attributes (e.g., demographic details (such as age, gender, income bracket, and location). The request information may further include digital footprints (traceable, inferred, or analyzed digital activities, actions, contributions, and communications on internet or on digital devices (such as the client device 106 or the plurality of secondary devices 110).

The request information may further include a user identifier (UID), a network configuration, a network (internet protocol) IP address, a device IP address, and client device type. The plurality of external inputs may include, but not limited to at least one of a calendar schedule of the user 114, local weather conditions, boarding pass of the user 114, a geographical location of the user 114, and a local traffic report. The constraints information may include a content constraint, a media format constrain, a time constraint, an inventory constraint, or a device constraint (as described in FIG. 1). The user intent information may include at least one of event information, situation information, or circumstance information associated with user engagement with the programming media content streamed in real time at the client device 106.

In response to the received request along with the request information, the media presentation and distribution system 102 may be configured to transmit the non-programming media content 306 along with an alternative media stream of dynamically generated personalized media content (such as the dynamically generated media content 308 that is programming or non-programming media content) and the play-out schedule 310 to the client device 106. The client device 106 may then execute, based on the play-out schedule 310, the playback of the received dynamically generated personalized media content (such as the dynamically generated media content 308) (e.g., trailers, recaps, highlights, reports, news highlights, etc.) at candidate time intervals in programming media content streamed at the client device 106.

Figure 4A:
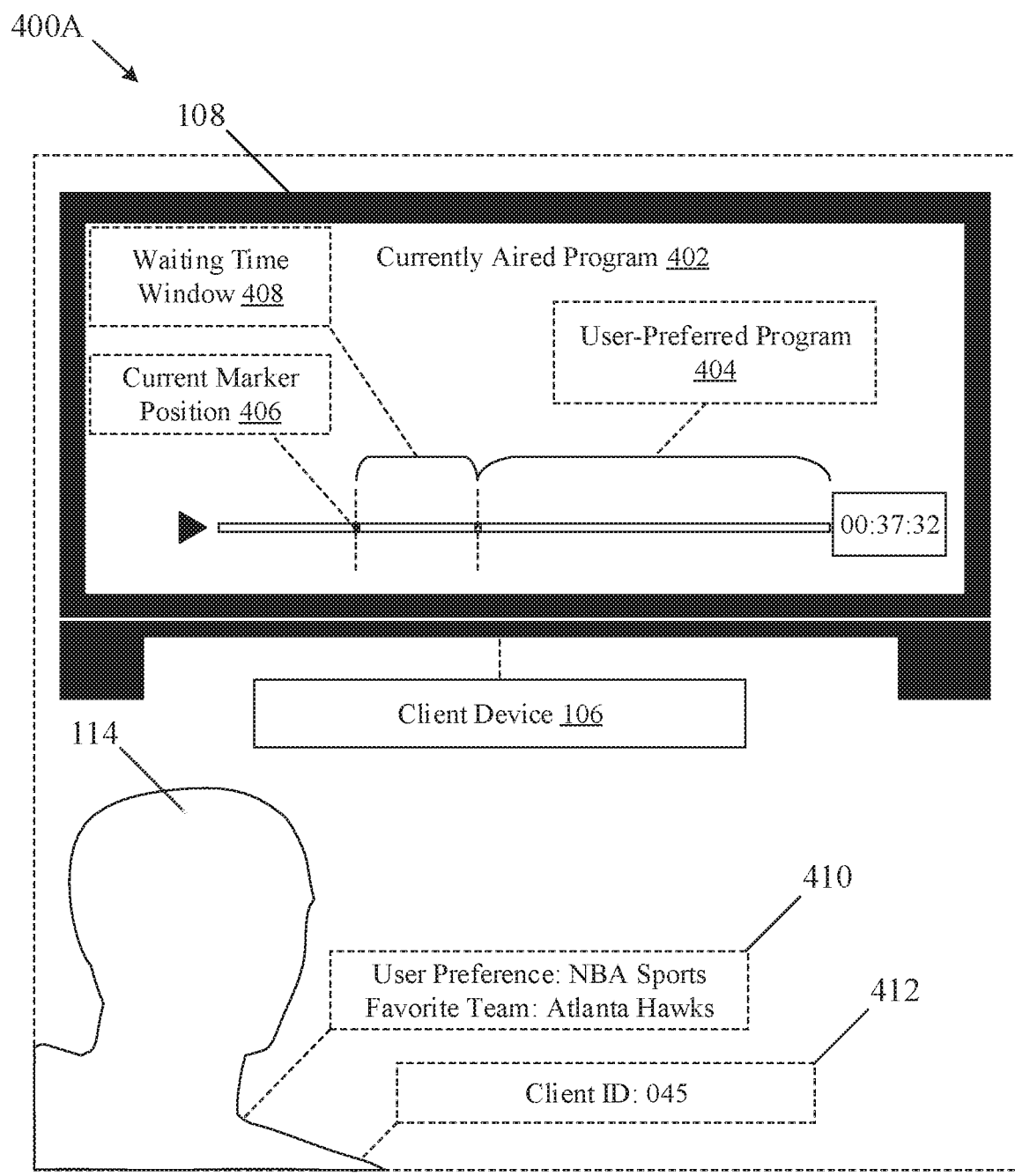
FIGS. 4A and 4B collectively depict a first exemplary scenario for client-side playback of personalized media content generated dynamically for various event opportunities in programming media content, in accordance with an embodiment of the disclosure.
Figure 4B:
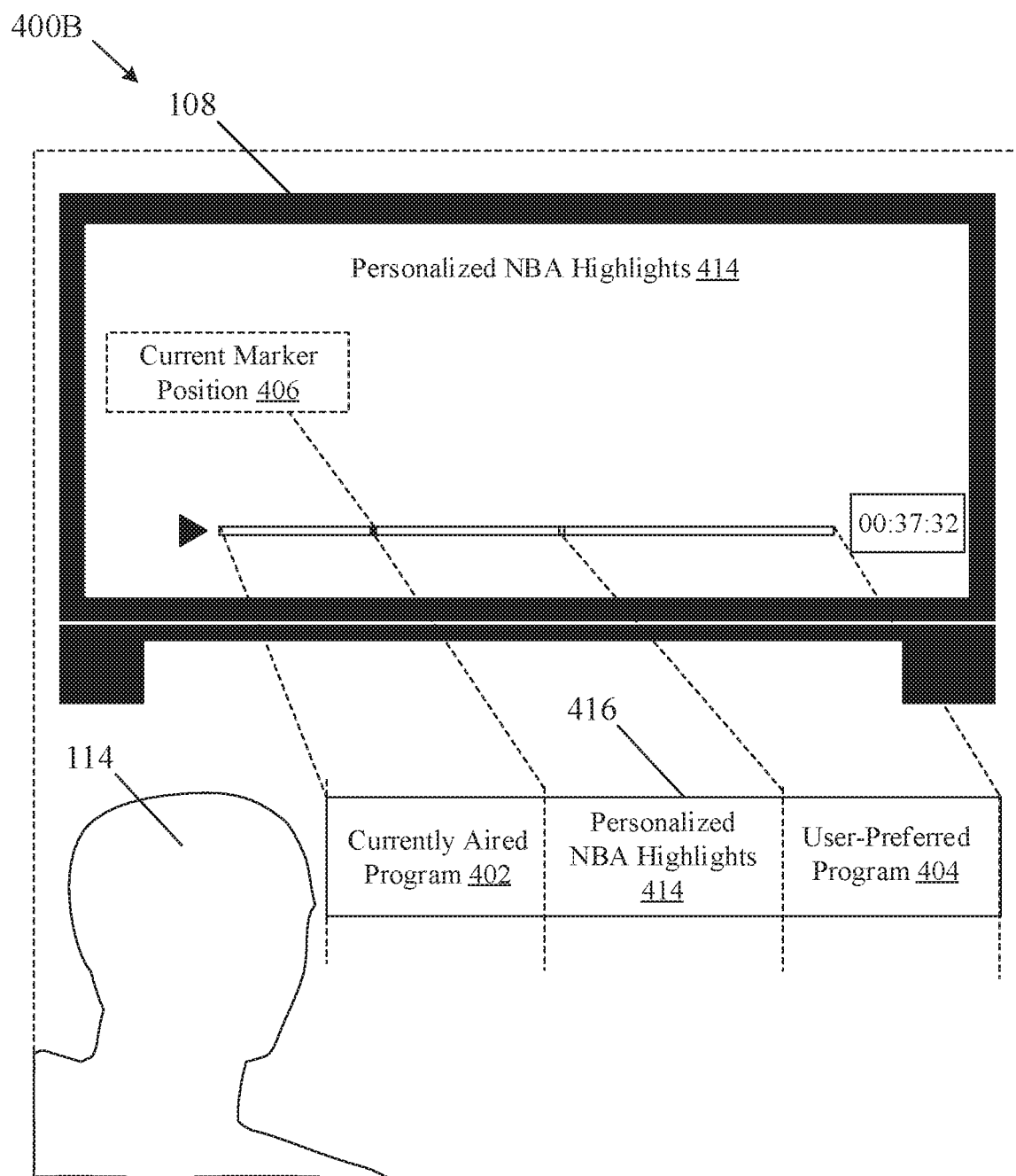

FIGS. 4A and 4B depict a first exemplary scenario for client-side playback of personalized media content generated dynamically for various event opportunities in programming media content, in accordance with an embodiment of the disclosure. FIGS. 4A and 4B are explained in conjunction with elements from FIGS. 1, 2, and 3. With reference to FIGS. 4A and 4B, there is shown a first scenario that shows two different states at different times (i.e., a first state 400A and a second state 400B) in which a stream of currently aired programming media content on the client device 106 in the first state 400A switches to an alternative stream of dynamically generated personalized media content in the second state 400B.

In the first state 400A, the client device 106 executes a playback of a currently aired program 402 presented via the display device 108. The currently aired program may be presented on a live linear network on client device 106. A user, for example, the user 114, may have a preference for a user-preferred program 404 that may be aired at a time (for example, at "00:40:00"). The media presentation and distribution system 102 may be configured to identify through the request information that the user 114 is interested in the user-preferred program 404 and may have switched to the live linear network a bit early. Therefore, the media presentation and distribution system 102 may determine a waiting time window 408 that spans a current marker position 406 (i.e. 00:37:42) in a play-out schedule up to the time (00:40:00), the user-preferred program 404 is played onto the display device 108. The waiting time window 408 may be equal to a difference between the time (00:40:00) and the current marker position 406 (i.e., 00:37:42), which is estimated to be 00:02:23 (i.e. 2 minutes 23 seconds), for example. The media presentation and distribution system 102 may be further configured to identify user attributes 410, for e.g., a user preference for NBA sports as a favorite type of sports and Atlanta Hawks as a favorite team, along with the client ID 412, for e.g., "045".

In second state 400B that occurs after the first state 400A, based on the user attributes 410, the client ID 412, and other parameters and constraints, the media presentation and distribution system 102 may be further configured to dynamically generate an alternative stream of personalized NBA highlights 414 and instruct playback of the personalized NBA highlights 414 in the waiting time window 408 onto the display device 108 associated with the client device 106. The playback may begin directly from the current marker position 406 and the media stream of the currently aired program 402 may be switched with the alternative stream during the waiting time window 408 (as shown in the timeline 416). In one embodiment, the media presentation and distribution system 102 may be configured to generate and instruct display of a notification or a recommendation onto the display device 108 at the current marker position 406. The notification or the recommendation may suggest the user, for e.g., the user 114, to watch personalized NBA highlights 414 for the last match played between two teams, for e.g., Atlanta Hawks and Dallas Mavericks. Upon user selection, the media stream of the currently aired program 402 may switch to the alternative stream of the personalized NBA highlights 414 and after the waiting time window 408, the alternative stream may be switched with the media stream of the user-preferred program 404. In some cases, a user option may be communicated onto the display device 108 to continue watching the complete stream of NBA highlights instead of the user-preferred program 404 in the waiting time window 408. In some cases, a manifest may be updated at the client device 106 based on control signals communicated by the media presentation and distribution system 102. The client device 106 may interpret the updated manifest, may switch to the alternative stream of the personalized NBA highlights 414 and after the waiting time window 408, the alternative stream may be further automatically switched with the media stream of the user-preferred program 404.

Figure 5A:
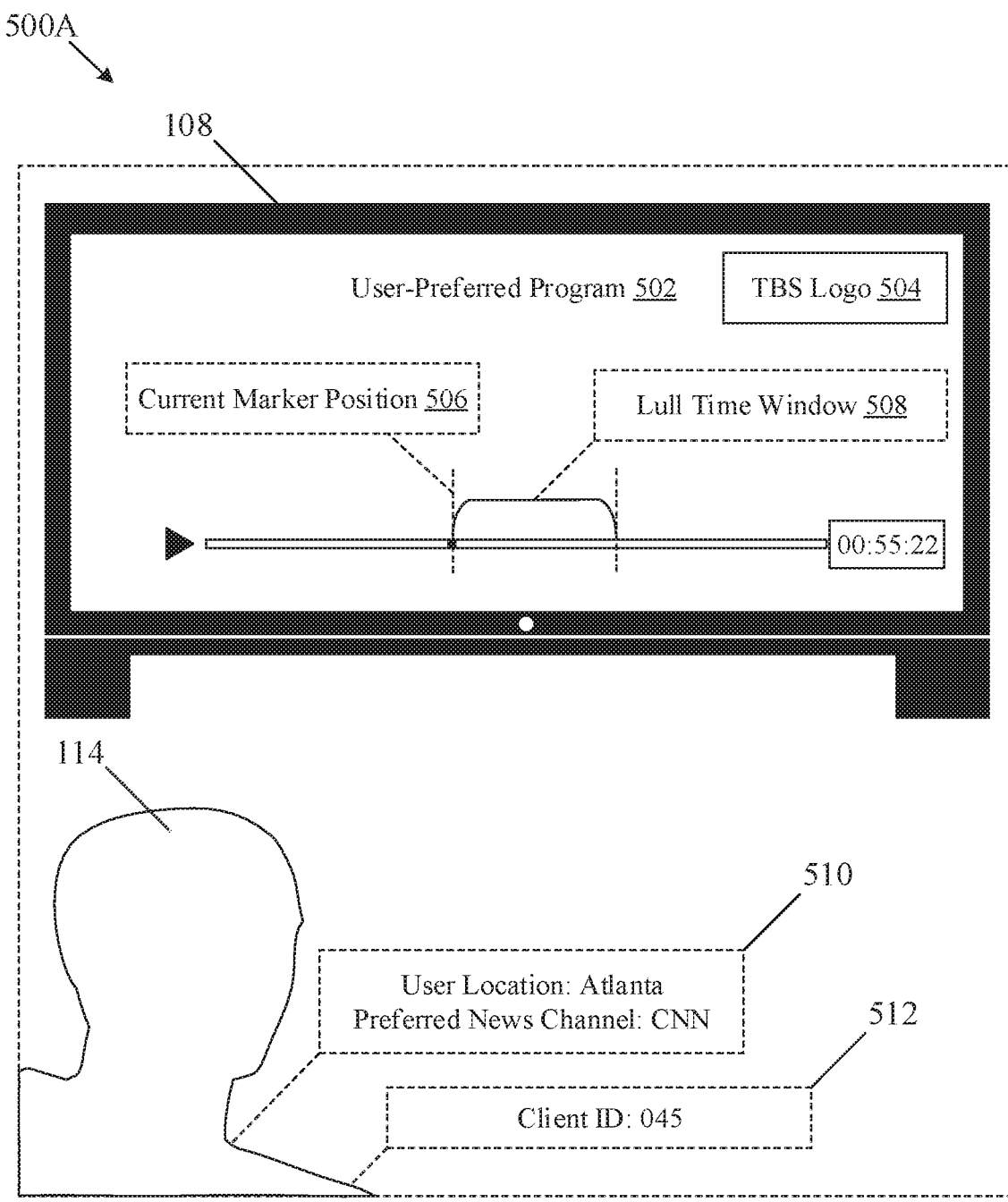
FIGS. 5A, 5B, and 5C collectively depict a second exemplary scenario for client-side playback of personalized media content generated dynamically for various event opportunities in programming media content, in accordance with another embodiment of the disclosure.
Figure 5B:
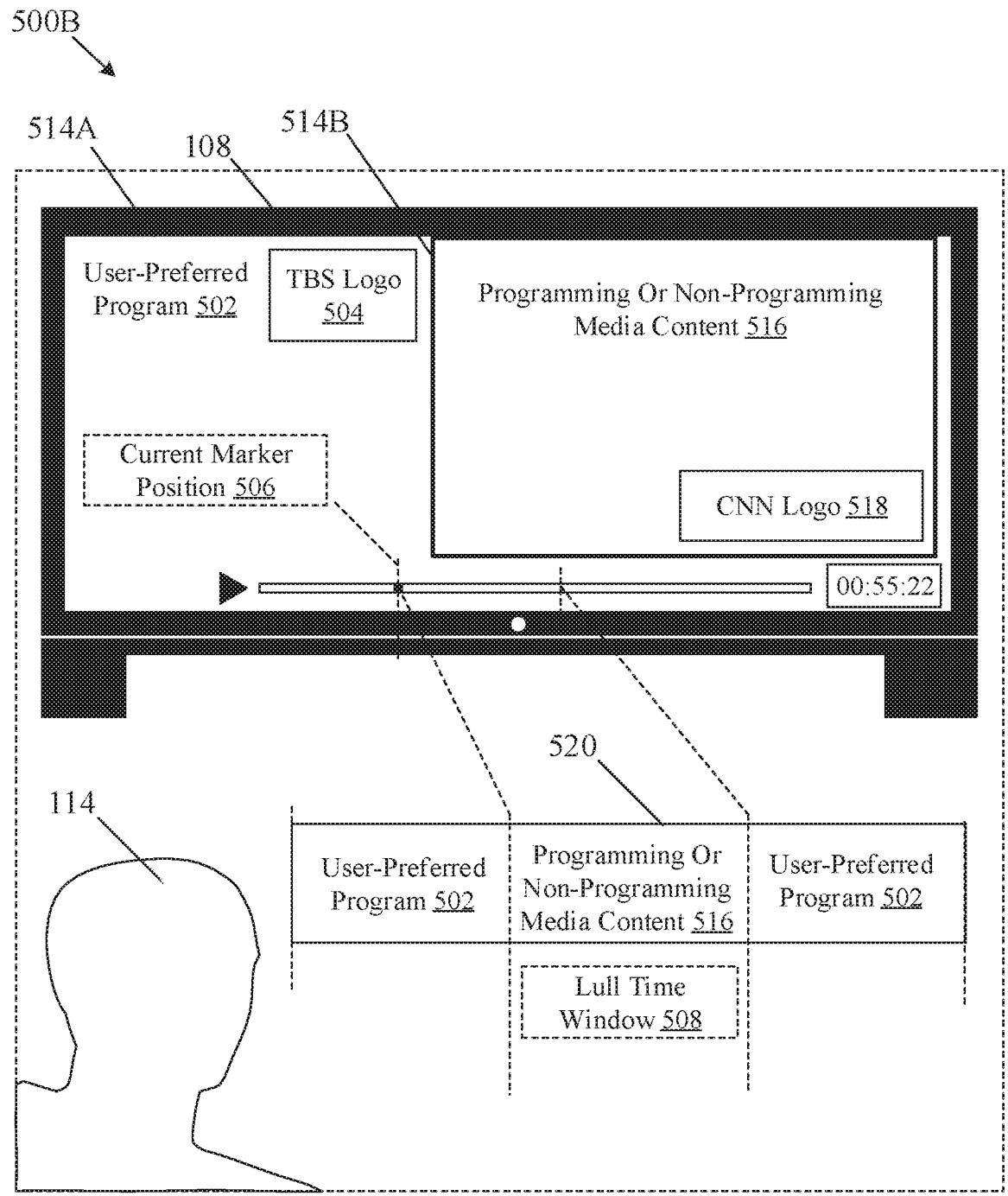
Figure 5C:
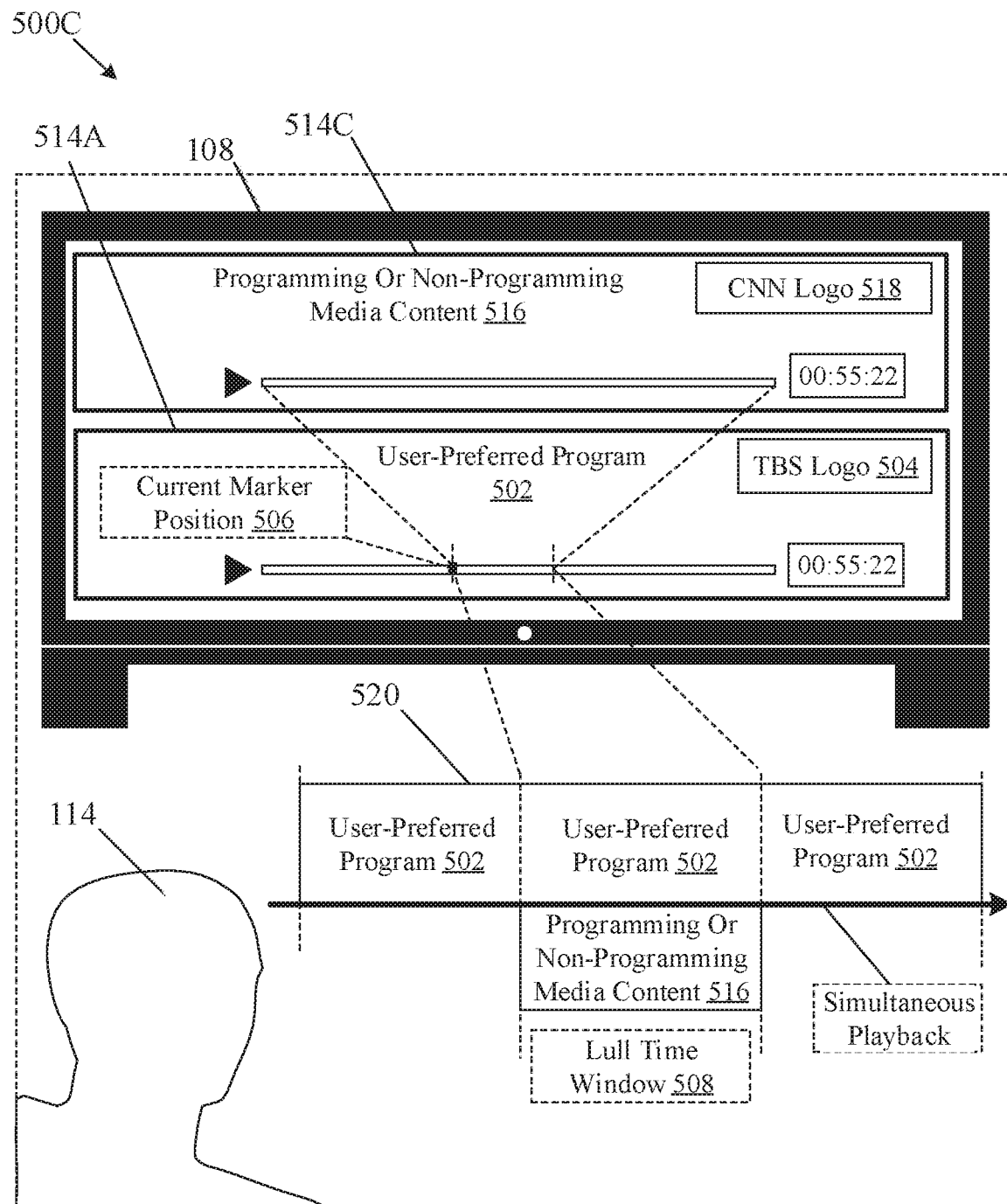

FIGS. 5A, 5B, and 5C depict a second exemplary scenario for client-side playback of personalized media content generated dynamically for various event opportunities in programming media content, in accordance with another embodiment of the disclosure. FIGS. 5A and 4B are explained in conjunction with elements from FIGS. 1, 2, and 3. With reference to FIGS. 5A and 5B, there is shown a second scenario that shows two different states at different times (i.e., a first state 500A and a second state 500B) in which a stream of currently aired programming media content on the client device 106 in the first state 500A is presented concurrently with an alternative stream of dynamically generated personalized media content in the second state 500B.

In the first state 500A, the client device 106 executes a playback of a user-preferred program 502 on a live linear network (for e.g., represented by a TBS logo 504) onto the display device 108. The currently aired program 502 may be presented on the live linear network on client device 106. A user, for example, the user 114, may experience a lull time (interval of low interest) that starts from a current marker position 506 and spans a lull time window 508. The media presentation and distribution system 102 may be configured to identify through the request information that the user 114 is experiencing a lull time and may switch to another network (or discontinue the playback based on user activities). Therefore, the media presentation and distribution system 102 may determine a lull time window 508 that spans a current marker position 506 (i.e. 00:55:22) in a play-out schedule to a time (t1). The lull time window 508 may be equal to a difference between the time (t1) and the current marker position 506 (i.e., 00:55:22). The media presentation and distribution system 102 may be further configured to identify user attributes 510, for e.g., user location as Atlanta, Ga., and CNN as preferred news channel along with the client ID 512, for e.g., "045".

In second state 500B that occurs after the first state 500A, based on the user attributes 510, the client ID 412, and other parameters and constraints, the media presentation and distribution system 102 may be further configured to dynamically generate an alternative stream of programming or non-programming media content 516 and further instruct playback of the programming or non-programming media content 516 in the lull time window 508 onto the display device 108. The client device 108 may modify a display view 514A that originally displayed the user-preferred program 502 to left side of the display device 108 and add a squeeze back window 514B displayed onto the right side of the display device 108. The squeeze back window 514B may present the programming or non-programming media content 516 on another network (for example, represented by CNN logo 518). The playback of the user-preferred program 502 and the programming or non-programming media content 516 may be concurrent (as shown by a timeline 520) at the display view 514A and the squeeze back window 514B, respectively. The playback of the alternative stream may begin directly from the current marker position 506 and proceed for a duration equal to the lull time window 508. In one embodiment, the media presentation and distribution system 102 may be configured to generate and display a notification or a recommendation onto the display device 108 at the current marker position 506. The notification (or the recommendation) may suggest the user, for e.g., the user 114, to watch the programming or non-programming media content 516. Upon user selection, the media stream of the user-preferred program 502 may be played along with the alternative stream of the programming or non-programming media content 516 and after the lull time window 508, the alternative stream may be discontinued and the media stream may resume with a full screen view on the display device 108.

With reference to FIG. 5C, there is shown a third state 500C that is an alternative state to the second state 500B. In the third state 500C, instead of a right side squeeze back window 514B, the full screen view on the display device 108 may split into two different display view, where the display view 514A that displays the user-preferred program 502 may be resized to a bottom (or top, or other sides) split view and a display view 514C that displays the programming or non-programming media content 516 may be resized to a top (or bottom, or other sides) split view. Thus, the user-preferred program 502 and the programming or non-programming media content 516 may be concurrently viewed at the client device 106 (or the display device 108) in the lull time window 508. In accordance with an embodiment, the full screen view on the display device 108 may be modified based on user preferences. For example, the proportion of display for the user-preferred program 502 in the full screen view may be greater than the proportion of display of the programming or non-programming media content 516 or vice-versa.

Figure 6A:
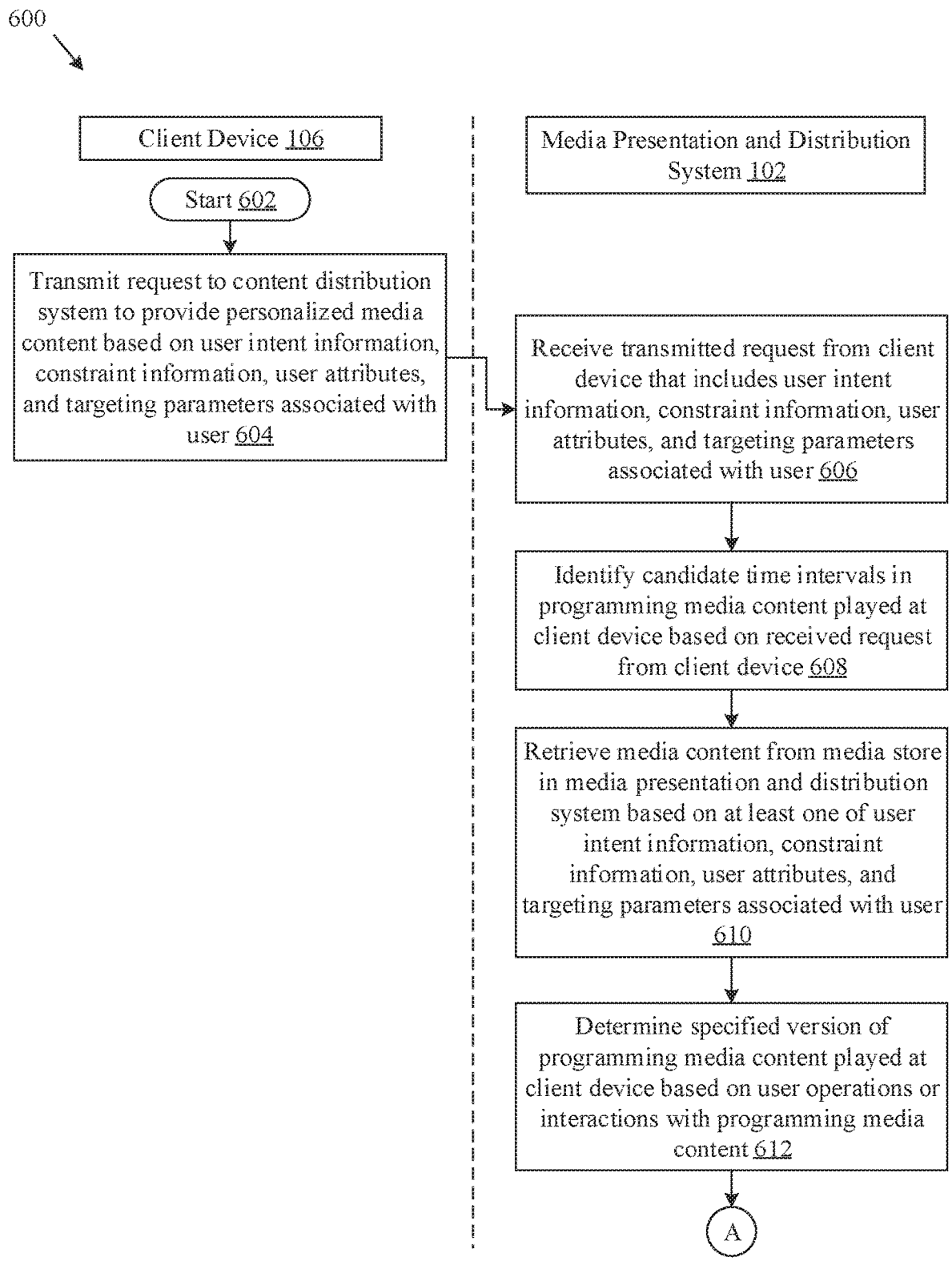
FIGS. 6A and 6B are flowcharts that collectively illustrate exemplary operations of the media presentation and distribution system of FIG. 2 that handles client-side playback of personalized media content generated dynamically for various event opportunities in programming media content, in accordance with an embodiment of the disclosure.
Figure 6B:
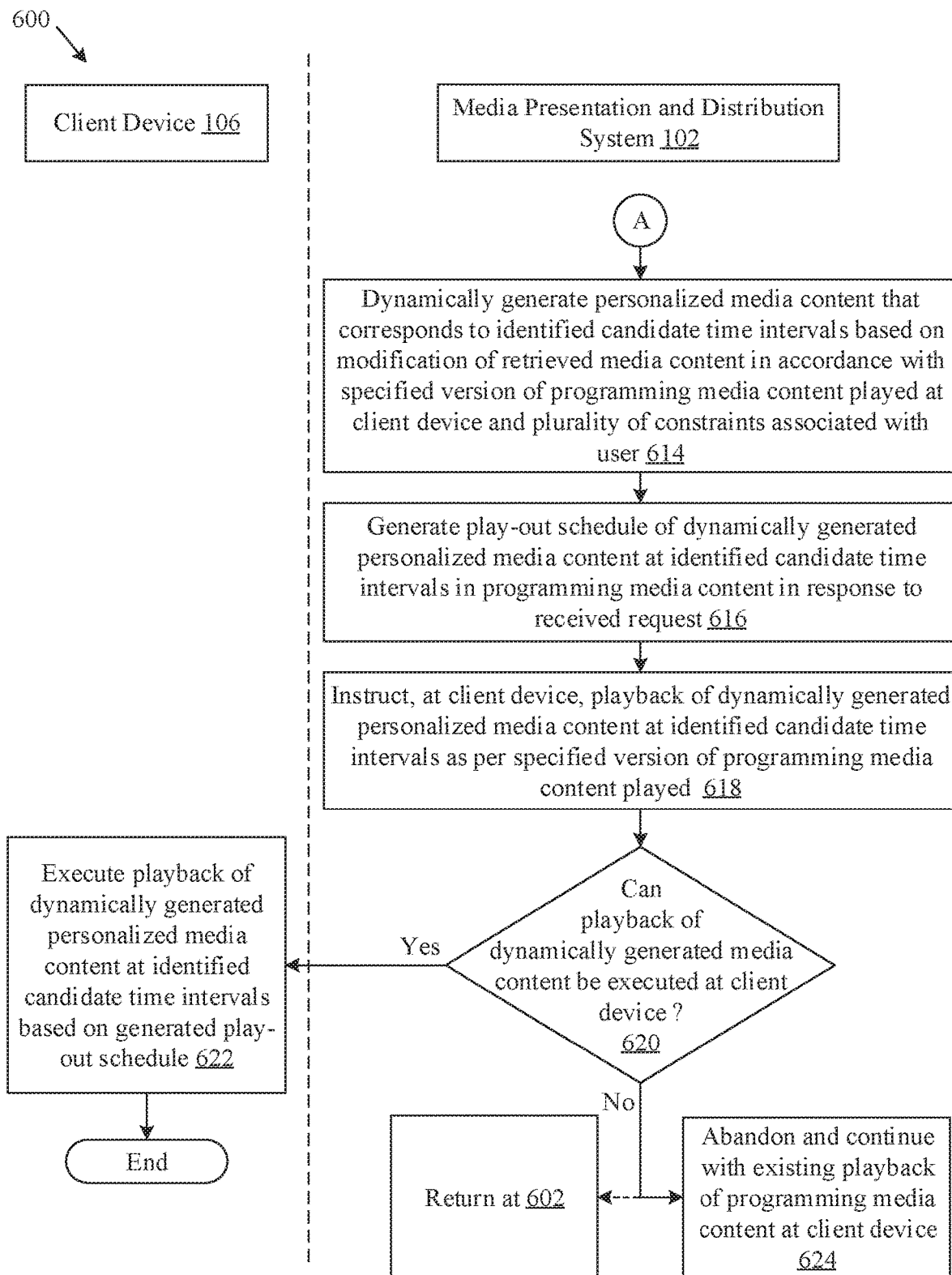

FIGS. 6A and 6B are flowcharts that collectively illustrate exemplary operations of the media presentation and distribution system of FIG. 2 that handles client-side playback of personalized media content generated dynamically for various event opportunities in programming media content, in accordance with an embodiment of the disclosure. The exemplary operations for the client-side concurrent presentation of non-programming media assets and programming media content may be done by the exemplary client device 106. FIGS. 6A and 6B may be described in conjunction with FIGS. 1, 2, 3, 4A, 4B, 5A, 5B, and 5C. With reference to FIGS. 6A and 6B, there is shown a flowchart 600 that includes exemplary operations from 602 through 622. The exemplary operations may start at 602 and proceed to 604.

At 604, a request may be transmitted to the media presentation and distribution system 102 to deliver personalized media content based on user intent information, constraint information, and user attributes, and targeting parameters associated with user 114. The client device 106 may be configured to transmit the request to the media presentation and distribution system 102 to deliver personalized media content based on user intent information, constraint information, and user attributes, and targeting parameters associated with user 114.

At 606, the transmitted request from client device 106 that includes user intent information, constraint information, user attributes, and targeting parameters associated with user 114 may be received. The media presentation and distribution system 102 may be configured to receive the transmitted request from client device 106 that includes user intent information, constraint information, user attributes, and targeting parameters associated with user 114.

At 608, candidate time intervals may be identified in programming media content played at client device 106 based on received request from client device 106. The media presentation and distribution system 102 may be configured to identify the candidate time intervals in the programming media content played at client device 106 based on received request from client device 106.

At 610, media content may be retrieved from a media store (or the content store 210) in the media presentation and distribution system 102 based on at least one of user intent information, constraint information, user attributes, and targeting parameters associated with user 114. The media presentation and distribution system 102 may be configured to retrieve the media content from a media store (or the content store 210) in the media presentation and distribution system 102, based on at least one of user intent information, constraint information, user attributes, and targeting parameters associated with user 114.

At 612, a specified version of programming media content played at client device 106 may be determined based on user operations or interactions with programming media content 612. The media presentation and distribution system 102 may be configured to determine a specified version of programming media content played at client device 106 based on user operations or interactions with programming media content. For example, the specified version of the programming media content may correspond to a linear or a non-linear version of the programming media content based on whether specific user options (e.g., skip buttons to next episode) are selected to modify playback of the programming media content.

At 614, personalized media content that corresponds to identified candidate time intervals may be dynamically generated based on modification of retrieved media content in accordance with specified version of programming media content played at client device 106 and plurality of constraints associated with user 114. The media presentation and distribution system 102 may be configured to dynamically generate the personalized media content that corresponds to the identified candidate time intervals. The personalized media content may be generated based on modification of retrieved media content in accordance with specified version of programming media content played at client device 106 and plurality of constraints associated with user 114.

At 616, a play-out schedule of the dynamically generated personalized media content at identified candidate time intervals in programming media content may be generated in response to received request. The media presentation and distribution system 102 may be configured to generate a play-out schedule of the dynamically generated personalized media content at identified candidate time intervals in programming media content in response to received request.

At 618, playback of the dynamically generated personalized media content at identified candidate time intervals may be instructed as per a specified version of programming media content. The media presentation and distribution system 102 may be configured to instruct the playback of the dynamically generated personalized media content at identified candidate time intervals in accordance with a specified version of programming media content.

At 620, it may be determined whether playback of the dynamically generated media content can be executed at the client device 106. In a case where the playback of the dynamically generated media content can be executed at the client device 106, control passes to 622. Otherwise, control passes to 624.

At 622, the playback of the dynamically generated personalized media content may be executed at the identified candidate time intervals based on generated play-out schedule. The client device 106 may be configured to execute the playback of the dynamically generated personalized media content at the identified candidate time intervals based on generated play-out schedule. Control passes to end.

At 624, the existing playback of programming media content may be continued at the client device 106 and the playback of the dynamically generated personalized media content may be abandoned. The media presentation and distribution system 102 may be configured to continue with the existing playback of programming media content at the client device 106 and abandon the playback of the dynamically generated personalized media content. In some cases, the control returns to 602.

Figure 7:
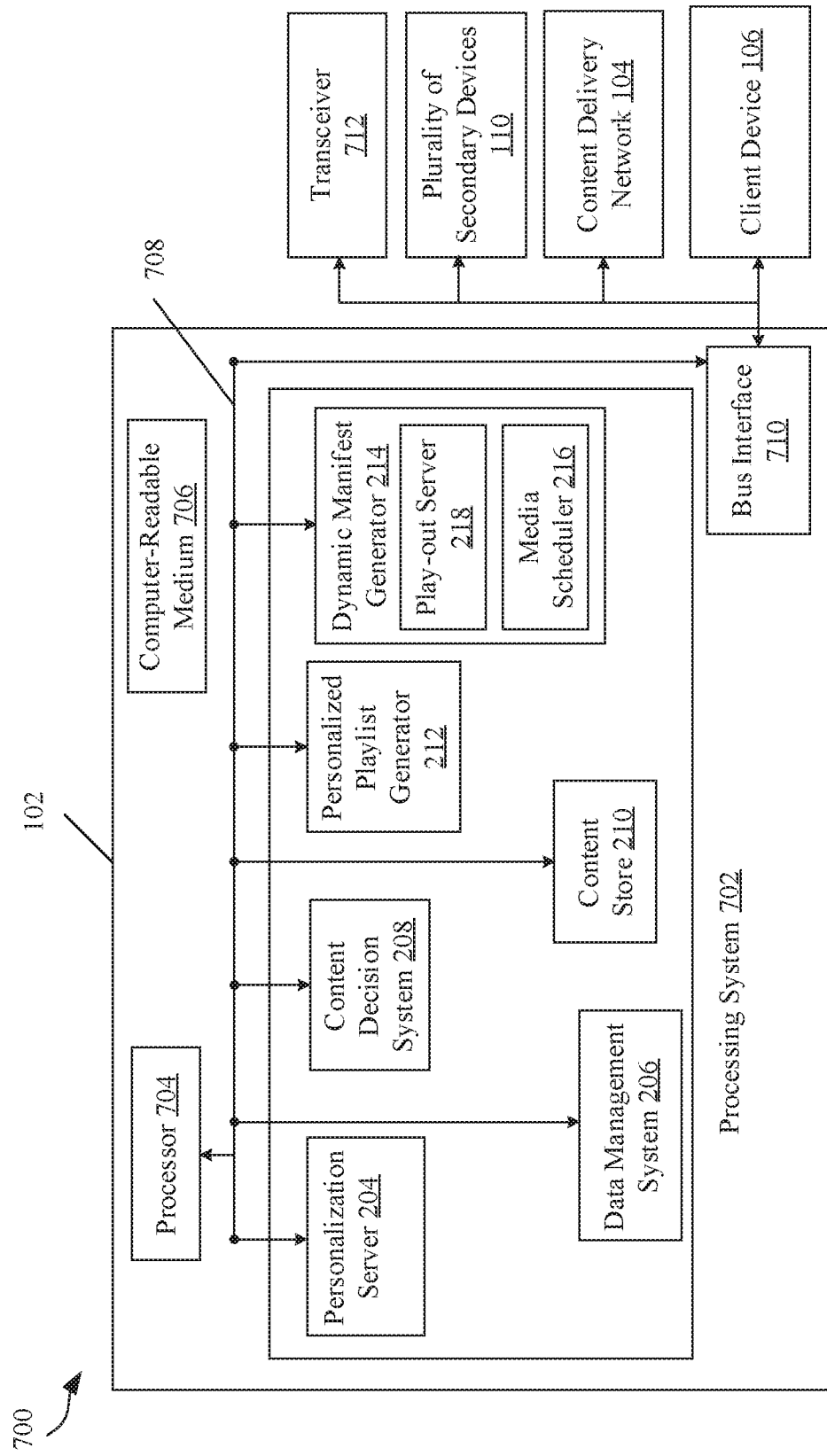
FIG. 7 is a conceptual diagram that illustrates an example of a hardware implementation for the media presentation and distribution system of FIG. 2 that employs a processing system that handles client-side playback of personalized media content generated dynamically for various event opportunities in programming media content, in accordance with an exemplary embodiment of the disclosure.

FIG. 7 is a conceptual diagram that illustrates an example of a hardware implementation for the media presentation and distribution system of FIG. 2 that employs a processing system that handles client-side playback of personalized media content generated dynamically for various event opportunities in programming media content, in accordance with an exemplary embodiment of the disclosure. With reference to FIG. 7, the hardware implementation is shown by a representation 700 for the media presentation and distribution system 102 for client-side playback of personalized media content generated dynamically for various event opportunities in programming media content, in accordance with an exemplary embodiment of the disclosure, as described herein. In some examples, the processing system 702 may comprise the one or more hardware processors 704, the non-transitory computer-readable medium 706, the PS 204, the DMS 206, the CDS 208, the CS 210, the PPG 212, the DMG 214, the SS 216, and the PLS 218.

In this example, the media presentation and distribution system 102 that employs the processing system 702 may be implemented with bus architecture, represented generally by the bus 708. The bus 708 may include any number of interconnecting buses and bridges depending on the specific implementation of the media presentation and distribution system 102 and the overall design constraints. The bus 708 links together various circuits including the one or more processors, represented generally by the hardware processor 704, the non-transitory computer-readable media, represented generally by the computer-readable medium 706, the PS 204, the DMS 206, the CDS 208, the CS 210, the PPG 212, the DMG 214, the SS 216, and the PLS 218 which may be configured to carry out one or more operations or methods described herein. A bus interface 710 renders an interface between the bus 708 and a transceiver 712. The transceiver 712 facilitates communication via the communication network 112 (FIG. 1) with various other apparatus, such as the CDN 104, the client device 106, and the plurality of secondary devices 110.

The hardware processor 704 may be configured to manage the bus 708 and general processing, including the execution of a set of instructions stored on the computer-readable medium 706. The set of instructions, when executed by the hardware processor 704, causes the media presentation and distribution system 102 to execute the various functions described herein for any particular apparatus. The computer-readable medium 706 may also be used for storing data that is manipulated by the hardware processor 704 when executing the set of instructions. The computer-readable medium 706 may also be configured to store data for one or more of the PS 204, the DMS 206, the CDS 208, the CS 210, the PPG 212, the DMG 214, the SS 216, and the PLS 218.

In accordance with an aspect of the disclosure, the hardware processor 704, the computer-readable medium 706, or a combination of both may be configured or otherwise specially programmed to execute the operations or functionality of the PS 204, the DMS 206, the CDS 208, the CS 210, the PPG 212, the DMG 214, the SS 216, and the PLS 218, or various other components described herein. For example, the hardware processor 704, computer-readable medium 706 (a non-transitory computer-readable medium), or a combination of both may be configured or otherwise specially programmed to perform the operations and functionality of the PS 204, the DMS 206, the CDS 208, the CS 210, the PPG 212, the DMG 214, the SS 216, and the PLS 218 as described with respect to FIGS. 1, 2, 3, 4A, 4B, 5A, 5B, 5C, 6A, and 6B.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing first one or more lines of code and may comprise a second "circuit" when executing second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g. and for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

The terminology used herein is for the purpose of describing particular embodiments only and is not intended to be limiting of embodiments of the present disclosure. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs) and graphical processing units (GPUs)), by program instructions being executed by one or more processors, or by a combination of both. Additionally, these sequence of actions described herein can be considered to be embodied entirely within any non-transitory form of computer readable storage medium having stored therein a corresponding set of computer instructions that upon execution would cause an associated processor to perform the functionality described herein. Thus, the various aspects of the present disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the present disclosure may provide a non-transitory machine and/or computer readable storage and/or media, having stored thereon, a machine code and/or a computer program having at least one code section executable by a machine and/or a computer, thereby causing the machine and/or computer to perform the steps as described herein to obtain a global workflow sequence.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithm, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the present disclosure has been described with reference to certain embodiments, it will be noted understood by, for example, those skilled in the art that various changes and modification could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the present disclosure described herein need not be performed in any particular order. Furthermore, although elements of the present disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A system, comprising:
   one or more processors in a media presentation and distribution system for media content distribution via a content delivery network, to a client device associated with a user, the one or more processors are configured to:
   identify at least one candidate time interval in programming media content played at the client device based on at least a request received from the client device, wherein the request includes user intent information and a plurality of constraints associated with a user;
   retrieve media content from a media store in the media presentation and distribution system based on the user intent information and a plurality of targeting parameters associated with the user;
   modify the retrieved media content based on a specified version of the programming media content played at the client device;
   generate personalized media content corresponding to the at least one candidate time interval in the programming media content based on the modification of the retrieved media content and at least one of the plurality of constraints associated with the user; and
   instruct to switch a first stream of a first programming media content on the client device in a first state to a second stream of the generated personalized media content in a second state at the client device, based on a contextual analysis of the programming media content at the client device,
   wherein the first state corresponds to playback of a currently aired program and the second state corresponds to a stream that occurs after the playback of the currently aired program, and
   wherein the generated personalized media content is presented at the identified at least one candidate time interval.

2. The system according to claim 1, wherein the identified at least one candidate time interval further corresponds to a first time interval prior to a start of the programming media content, a second time interval during playback of the programming media content, or a third time interval at an end of the programming media content.

3. The system according to claim 2, wherein the one or more processors are further configured to determine the first time interval, the second time interval, and the third time interval based at least on the contextual analysis of the programming media content at the client device or tags associated with a plurality of segments of the programming media content.

4. The system according to claim 2, wherein the first time interval, the second time interval, and the third time interval in the programming media content corresponds to at least one of a start credit, an end credit, an ad break, tagged media content, or a lull point in the programming media content.

5. The system according to claim 1, wherein the one or more processors are further configured to distribute the programming media content to a plurality of client devices via the content delivery network.

6. The system according to claim 1, wherein the plurality of constraints correspond to at least a content constraint, a media format constraint, a time constraint, an inventory constraint, or a device constraint.

7. The system according to claim 1, wherein the request further comprises at least one of a user identifier (ID), a client ID of the client device, or the plurality of targeting parameters associated with the user.

8. The system according to claim 1, wherein the user intent information comprises at least one of event information, situation information, or circumstance information associated with user engagement with the programming media content at the client device.

9. The system according to claim 1, wherein the plurality of targeting parameters associated with the user comprises at least one of one or more user preferences, a user profile, demographic details, historical preferences, time of day, time of next event, or a plurality of external inputs from the client device.

10. The system according to claim 9, wherein the one or more processors are further configured to receive the plurality of external inputs from an application manager executed at the client device, wherein the plurality of external inputs comprise at least one of a calendar schedule of the user, local weather conditions, boarding pass of the user, a geographical location of the user, or a local traffic report.

11. The system according to claim 1, wherein the generated personalized media content comprises at least one segment of the retrieved media content and at least one of media transitions, pre-encoded video-on-demand (VOD) assets, live content, a media clip, or a media highlight.

12. The system according to claim 1, wherein the one or more processors are further configured to generate a play-out schedule for the generated personalized media content at the identified at least one candidate time interval in response to the received request.

13. The system according to claim 12, wherein the play-out schedule of the generated personalized media content comprises at least one of details of the user, a media distribution channel on which the programming media content is distributed, or other specified versions of the generated personalized media content scheduled for delivery at the client device in a defined sequence.

14. The system according to claim 1, wherein the one or more processors are further configured to determine the specified version of the programming media content viewed at the client device based on one or more trick mode operations executed at the client device on the programming media content, wherein the retrieved media content corresponds to at least one of a static type of media content or a dynamic type of media content, and wherein the modification of the retrieved media content, based on at least the plurality of constraints, corresponds to a trimmed version of the retrieved media content or a compressed version, and wherein the compressed version is based on a removal of one or more frames in the retrieved media content.

15. A method, comprising:

in a media presentation and distribution system for media content distribution via a content delivery network, to a client device associated with a user:

identifying, by one or more processors, at least one candidate time interval in programming media content played at the client device based on at least a request received from the client device, wherein the request includes user intent information and a plurality of constraints associated with a user;

retrieving, by the one or more processors, media content from a media store in the media presentation and distribution system based on the user intent information and a plurality of targeting parameters associated with the user;

modifying the retrieved media content based on a specified version of the programming media content played at the client device;

generating, by the one or more processors, personalized media content corresponding to the at least one candidate time interval in the programming media content based on the modification of the retrieved media content and at least one of the plurality of constraints associated with the user; and instructing switching, by the one or more processors, a first stream of a first programming media content on the client device in a first state to a second stream of the generated personalized media content in a second state at the client device, based on a contextual analysis of the programming media content at the client device, wherein the first state corresponds to playback of a currently aired program and the second state corresponds to a stream that occurs after the playback of the currently aired program, and wherein the generated personalized media content is presented at the identified at least one candidate time interval.

16. The method according to claim 15, further comprising determining, by the one or more processors, a first time interval, a second time interval, and a third time interval based at least on a contextual analysis of the programming media content at the client device or tags associated with a plurality of segments of the programming media content.

17. The method according to claim 16, wherein the first time interval, the second time interval, and the third time interval in the programming media content corresponds to at least one of a start credit, an end credit, an ad break, tagged media content, or a lull point in the programming media content.

18. The method according to claim 15, wherein the plurality of targeting parameters associated with the user comprises at least one of one or more user preferences, a user profile, demographic details, historical preferences, time of day, time of next event, or a plurality of external inputs from the client device.

19. The method according to claim 18, further comprising receiving by the one or more processors, the plurality of external inputs from an application manager executed at the client device, wherein the plurality of external inputs comprise at least one of a calendar schedule of the user, local weather conditions, boarding pass of the user, a geographical location of the user, or a local traffic report.

20. A non-transitory computer-readable medium having stored thereon, computer implemented instruction that when executed by a processor, causes the processor to execute operations, the operations comprising:

in a media presentation and distribution system for media content distribution via a content delivery network, to a client device associated with a user:

identifying at least one candidate time interval in programming media content played at the client device based on at least a request received from the client device, wherein the request includes at least one of user intent information and a plurality of constraints associated with a user;

retrieving media content from a media store in the media presentation and distribution system based on at least one of the user intent information and a plurality of targeting parameters associated with the user;

modifying the retrieved media content based on a specified version of the programming media content played at the client device;

generating personalized media content corresponding to the at least one candidate time interval in the programming media content based on the modification of the retrieved media content and at least one of the plurality of constraints associated with the user; and instructing to switch a first stream of a first programming media content on the client device in a first state to a second stream of the generated personalized media content in a second state based on a contextual analysis of the programming media content at the client device, wherein the first state corresponds to playback of a currently aired program and the second state corresponds to a stream that occurs after the playback of the currently aired program, and wherein the generated personalized media content is presented at the identified at least one candidate time interval.

* * * * *